United States Patent
Nagata

(10) Patent No.: US 10,348,916 B2
(45) Date of Patent: Jul. 9, 2019

(54) DISPLAY INPUT DEVICE, IMAGE FORMING APPARATUS, DISPLAY CONTROL METHOD, AND NON-TRANSITORY COMPUTER RECORDING MEDIUM FOR AN IMPROVED GUI INCLUDING A PLURALITY OF DISPLAY AREA TYPES

(71) Applicant: Tadashi Nagata, Kanagawa (JP)

(72) Inventor: Tadashi Nagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 11 days.

(21) Appl. No.: 15/249,987

(22) Filed: Aug. 29, 2016

(65) Prior Publication Data

US 2017/0078504 A1    Mar. 16, 2017

(30) Foreign Application Priority Data

Sep. 15, 2015   (JP) ................. 2015-182334

(51) Int. Cl.
  G06F 8/38        (2018.01)
  G09G 5/14        (2006.01)
  G09G 5/38        (2006.01)
  H04N 1/00        (2006.01)
  G03G 15/00       (2006.01)
  (Continued)

(52) U.S. Cl.
  CPC ..... *H04N 1/00506* (2013.01); *G03G 15/5016* (2013.01); *G06F 8/38* (2013.01); *G06F 9/451* (2018.02); *G09G 5/14* (2013.01); *G09G 5/373* (2013.01); *G09G 5/38* (2013.01); *G09G 5/391* (2013.01); *H04N 1/00413* (2013.01); *G09G 2320/0613* (2013.01); *G09G 2320/08* (2013.01);
  (Continued)

(58) Field of Classification Search
  CPC ........... G06F 3/04817; G03G 15/5016; H04N 1/00506
  USPC .......................................... 345/667
  See application file for complete search history.

(56) References Cited

U.S. PATENT DOCUMENTS

2008/0307428 A1   12/2008   Hagiwara et al.
2009/0051953 A1   2/2009    Hagiwara et al.
(Continued)

FOREIGN PATENT DOCUMENTS

JP         8-030637       2/1996
JP         2007-122285    5/2007
(Continued)

*Primary Examiner* — Shivang I Patel
(74) *Attorney, Agent, or Firm* — Harness, Dickey & Pierce, P.L.C.

(57) ABSTRACT

A display input device includes a display panel to display a screen thereon, the screen including a plurality of display areas, and a memory to store specification information, GUI information, and layout information. The GUI information includes information on a plurality of GUIs to be displayed on the screen, the plurality of GUIs being classified into a plurality of groups of GUIs. The layout information associates each one of the plurality of display areas with one group of the plurality of GUIs to be displayed on each display area. The display input device further includes circuitry to scale each display area in accordance with a change in the size or the resolution of the screen, and change one of a size of at least one GUI to be displayed in the scaled display area and a number of GUIs to be displayed in the scaled display area.

20 Claims, 23 Drawing Sheets

(51) Int. Cl.
  *G06F 9/451* (2018.01)
  *G09G 5/373* (2006.01)
  *G09G 5/391* (2006.01)
(52) U.S. Cl.
  CPC ............. *G09G 2340/045* (2013.01); *G09G 2340/0464* (2013.01); *G09G 2340/0478* (2013.01)

(56) References Cited

U.S. PATENT DOCUMENTS

| | | | |
|---|---|---|---|
| 2009/0102110 A1 | 4/2009 | Endoh et al. | |
| 2009/0109474 A1 | 4/2009 | Tanabe et al. | |
| 2009/0201527 A1* | 8/2009 | Yamada | G03G 15/5016 358/1.15 |
| 2011/0020027 A1* | 1/2011 | Takubo | G06F 3/04886 399/81 |
| 2011/0107202 A1* | 5/2011 | El-Shishiny | G06F 17/21 715/243 |
| 2011/0292439 A1 | 12/2011 | Nagata et al. | |
| 2012/0192077 A1* | 7/2012 | Castellani | G03G 15/5079 715/740 |
| 2013/0305187 A1* | 11/2013 | Phillips | G06F 3/04817 715/800 |
| 2014/0059498 A1* | 2/2014 | McCormack | G06Q 10/06 715/854 |
| 2014/0082747 A1 | 3/2014 | Negoro et al. | |
| 2014/0226181 A1 | 8/2014 | Shibukawa et al. | |
| 2014/0226185 A1 | 8/2014 | Iwasa et al. | |
| 2014/0258913 A1 | 9/2014 | Shibukawa et al. | |
| 2014/0325199 A1 | 10/2014 | Iwasa et al. | |
| 2014/0325526 A1 | 10/2014 | Nagata et al. | |
| 2014/0365757 A1 | 12/2014 | Masuyama et al. | |
| 2015/0036161 A1 | 2/2015 | Nagata | |
| 2015/0156348 A1 | 6/2015 | Kittaka et al. | |
| 2016/0239163 A1* | 8/2016 | Singal | G06F 3/0482 |

FOREIGN PATENT DOCUMENTS

| | | |
|---|---|---|
| JP | 2007-317086 | 12/2007 |
| JP | WO2008/087912 | 7/2008 |
| JP | 2010-039651 | 2/2010 |
| JP | 2010-160753 | 7/2010 |

* cited by examiner

| TYPE | ID | ATTRIBUTE INFORMATION |
|---|---|---|
| BASE AREA | Base_001 | START COORDINATE: 0, 0<br>SIZE: 1024×600 |
| DISPLAY AREA | Disp_001 | START COORDINATE: 10, 15<br>SIZE: 1004×570<br>TYPE: NUMBER INCREASE/DECREASE TYPE |
| UI PART | UI_001 | DISPLAY AREA TO WHICH UI PART BELONGS: Disp_001 |
| UI PART | UI_002 | DISPLAY AREA TO WHICH UI PART BELONGS: Disp_001 |
| ... | | ... |

FIG. 8

| TYPE | ID | ATTRIBUTE INFORMATION |
|---|---|---|
| BASE AREA | Base_001 | START COORDINATE: 0, 0<br>SIZE: 1024 × 600 |
| DISPLAY AREA | Disp_001 | START COORDINATE: 10, 15<br>SIZE: 1004 × 80<br>TYPE: NUMBER INCREASE/DECREASE TYPE |
| UI PART | UI_001 | DISPLAY AREA TO WHICH UI PART BELONGS: Disp_001 |
| UI PART | UI_002 | DISPLAY AREA TO WHICH UI PART BELONGS: Disp_001 |
| ... | ... | ... |
| DISPLAY AREA | Disp_002 | START COORDINATE: 10, 120<br>SIZE: 500 × 450<br>TYPE: SCALING TYPE |
| UI PART | UI_005 | DISPLAY AREA TO WHICH UI PART BELONGS: Disp_002 |
| ... | ... | ... |
| DISPLAY AREA | Disp_003 | START COORDINATE: 505, 120<br>SIZE: 500 × 450<br>TYPE: NUMBER INCREASE/DECREASE TYPE |
| UI PART | UI_006 | DISPLAY AREA TO WHICH UI PART BELONGS: Disp_003 |
| ... | ... | ... |

FIG. 9

| ID | ATTRIBUTE INFORMATION |
|---|---|
| UI_001 | SIZE: 100 × 80<br>TYPE: KEY |
| UI_002 | SIZE: 100 × 80<br>TYPE: KEY |
| UI_003 | SIZE: 100 × 80<br>TYPE: KEY |
| UI_004 | SIZE: 100 × 80<br>TYPE: KEY |
| UI_005 | SIZE: 500 × 450<br>TYPE: IMAGE<br>FILE NAME: image.png |
| ... | ... |

FIG. 13

| TYPE | ID | ATTRIBUTE INFORMATION |
|---|---|---|
| DISPLAY AREA | Disp_001 | START COORDINATE: 10, 15<br>SIZE: 1450 × 180<br>TYPE: NUMBER INCREASE/DECREASE TYPE |
| UI PART | UI_001 | DISPLAY AREA TO WHICH UI PART BELONGS: Disp_001 |
| UI PART | UI_002 | DISPLAY AREA TO WHICH UI PART BELONGS: Disp_001 |
| ... | ... | ... |
| UI PART | UI_020 | DISPLAY AREA TO WHICH UI PART BELONGS: Disp_001 |

FIG. 14

| ID | ATTRIBUTE INFORMATION |
|---|---|
| UI_001 | SIZE: 150 × 80<br>TYPE: KEY |
| UI_002 | SIZE: 150 × 80<br>TYPE: KEY |
| ... | ... |
| UI_020 | SIZE: 150 × 80<br>TYPE: KEY |

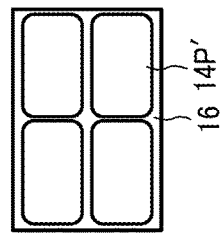
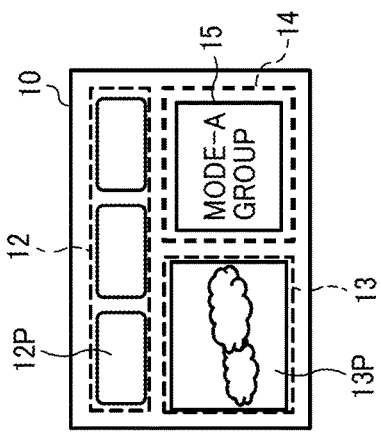
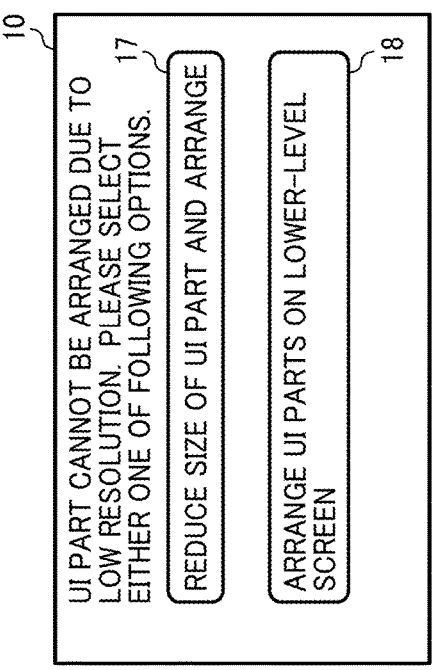
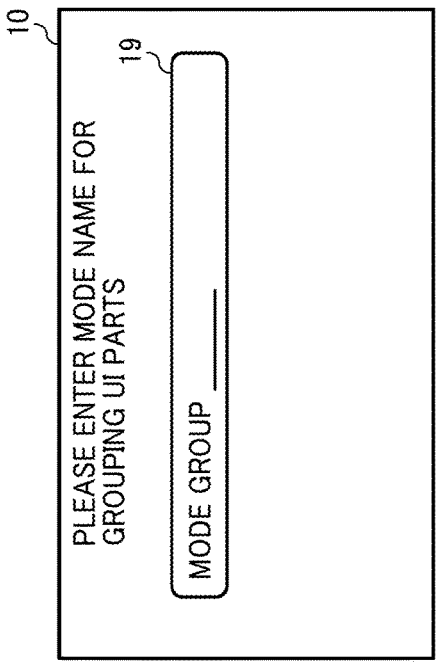

| ENTRY STATUS OF HARDWARE PART INFORMATION | | ENTERED |
|---|---|---|
| HARDWARE PART ID | HARDWARE PART NAME | POSITION COORDINATE OF HARDWARE PART |
| 01 | HOME KEY | 512, 650 |
| 02 | POWER LED | 1000, -10 |
| 03 | STATUS CHECK LED | 10, 620 |
| ... | ... | |

FIG. 24A

PLEASE ENTER PRESENCE OR ABSENCE OF
HARDWARE PART AND POSITION COORDINATE

| HARDWARE PART NAME | COORDINATE INFORMATION |
|---|---|
| ☐ HOME KEY | |
| ☐ POWER LED | |
| ☐ STATUS CHECK LED | |

FIG. 24B

PLEASE ENTER PRESENCE OR ABSENCE OF
HARDWARE PART AND POSITION COORDINATE

| HARDWARE PART NAME | COORDINATE INFORMATION |
|---|---|
| ☑ HOME KEY | 👆 |
| ☐ POWER LED | |
| ☐ STATUS CHECK LED | |

FIG. 24C

PLEASE ENTER COORDINATE x [ 512 ]
y [ 650 ]

( 1 ) ( 2 ) ( 3 )
( 4 ) ( 5 ) ( 6 )
( 7 ) ( 8 ) ( 9 )
( C ) ( 0 ) ( # )

[ ENTER ]

FIG. 24D

PLEASE ENTER PRESENCE OR ABSENCE OF
HARDWARE PART AND POSITION COORDINATE

| HARDWARE PART NAME | COORDINATE INFORMATION |
|---|---|
| ☑ HOME KEY | (512, 650) |
| ☐ POWER LED | |
| ☐ STATUS CHECK LED | |

FIG. 25A

PLEASE ENTER NAME OF PRESSED HARDWARE PART

NEW HARDWARE KEY

FIG. 25B

PLEASE ENTER PRESENCE OR ABSENCE OF HARDWARE PART AND POSITION COORDINATE

| HARDWARE PART NAME | COORDINATE INFORMATION |
|---|---|
| HOME KEY | (512, 650) |
| POWER LED | |
| STATUS CHECK LED | |
| NEW HARDWARE KEY | |

FIG. 25C

PLEASE ENTER COORDINATE

① ② ③
④ ⑤ ⑥
⑦ ⑧ ⑨
C ⓪ # x  1044
y  300

ENTER

FIG. 25D

PLEASE ENTER PRESENCE OR ABSENCE OF HARDWARE PART AND POSITION COORDINATE

| HARDWARE PART NAME | COORDINATE INFORMATION |
|---|---|
| HOME KEY | (512, 650) |
| POWER LED | |
| STATUS CHECK LED | |
| NEW HARDWARE KEY | (1044, 300) |

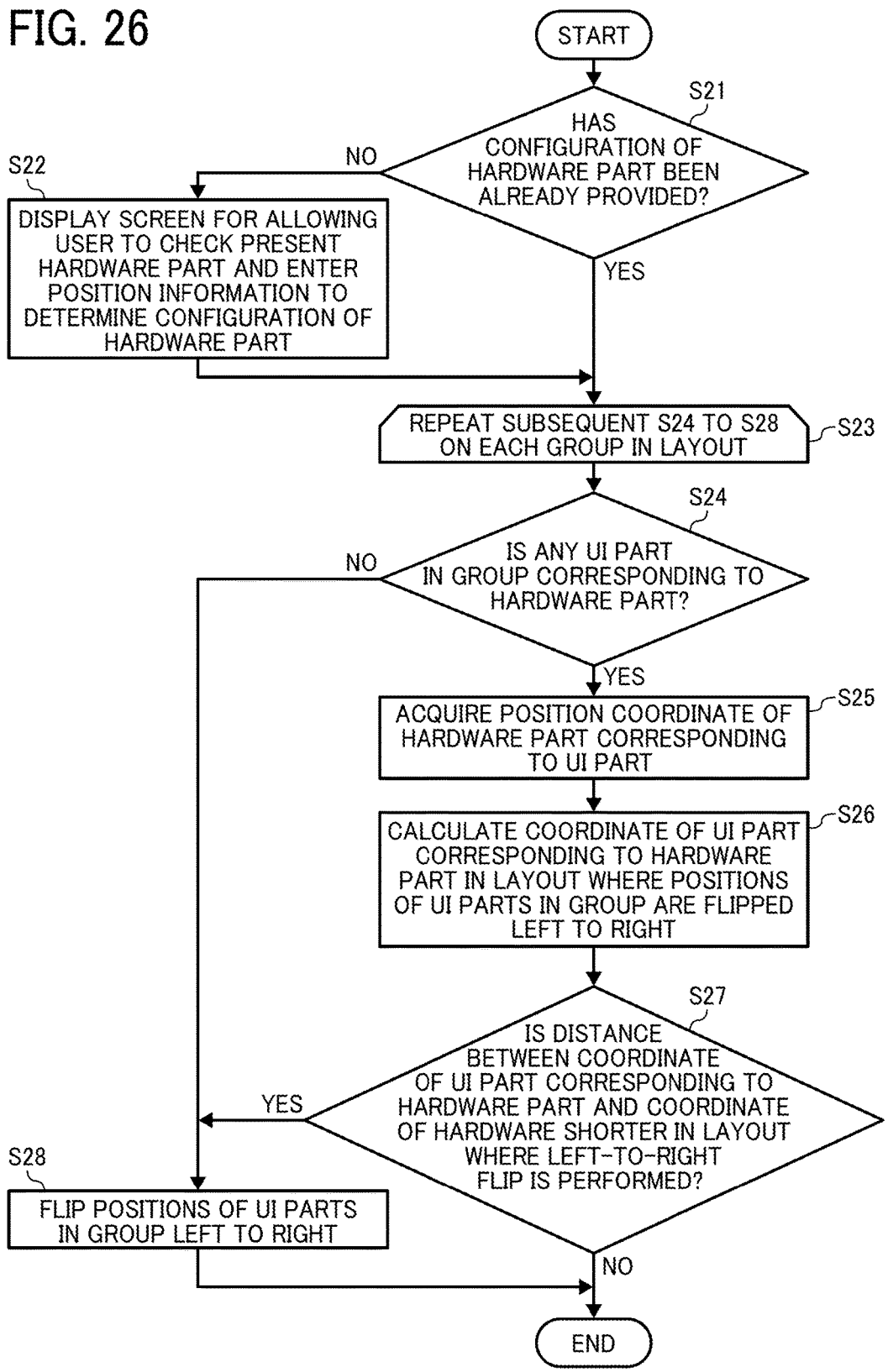

FIG. 28

| GROUP NAME | COORDINATE AND SIZE OF GROUP | | UI PART ID IN GROUP | COORDINATE AND SIZE OF UI PART | |
|---|---|---|---|---|---|
| Group01 | (0, 0) | 600 × 400 | — | — | — |
| — | — | — | 01 | (5, 5) | 150 × 120 |
| — | — | — | 02 | (155, 5) | 150 × 120 |
| | | | 03 | (305, 5) | 150 × 120 |
| | | | 04 | (5, 125) | 150 × 120 |
| | | | 05 | (155, 125) | 150 × 120 |
| | | | 06 | (305, 125) | 150 × 120 |
| Group02 | (600, 0) | 400 × 400 | ⋮ | ⋮ | ⋮ |
| Group03 | (0, 560) | 40 × 1024 | — | — | — |
| | | | 09 | (5, 565) | 200 × 100 |
| ⋮ | ⋮ | ⋮ | ⋮ | ⋮ | ⋮ |

| ID | PART (*) | CORRESPONDING HARDWARE PART (ID) |
|---|---|---|
| 01 | A | – |
| 02 | B | – |
| ... | ... | ... |
| 09 | STATUS CON-FIRMATION KEY | 03 |
| 10 | J | – |
| 11 | K | – |

| HARDWARE PART ID | HARDWARE PART NAME | POSITION COORDINATE OF HARDWARE PART |
|---|---|---|
| 01 | HOME KEY | 512, 650 |
| 02 | POWER LED | 1000, −10 |
| 03 | STATUS CONFIRMATION LED | 10, 620 |
| ... | ... | ... |

DISPLAY INPUT DEVICE, IMAGE FORMING APPARATUS, DISPLAY CONTROL METHOD, AND NON-TRANSITORY COMPUTER RECORDING MEDIUM FOR AN IMPROVED GUI INCLUDING A PLURALITY OF DISPLAY AREA TYPES

CROSS-REFERENCE TO RELATED APPLICATIONS

This patent application is based on and claims priority pursuant to 35 U.S.C. § 119(a) to Japanese Patent Application No. 2015-182334, filed on Sep. 15, 2015 in the Japan Patent Office, the entire disclosure of which is hereby incorporated by reference herein.

BACKGROUND

Technical Field

The present disclosure relates to a display input device, an image forming apparatus including the display input device, a display control method, and a non-transitory recording medium.

Description of the Related Art

Electronic apparatuses embedded with a microcomputer such as information processing apparatuses, personal computers, mobile terminals, and tablet terminals provide a user interface (UI) to allow users to interact with the apparatus.

Graphical user interfaces (GUI) are currently in widespread use. The GUIs allow users to give instructions to the electronic apparatuses and the information processing apparatuses through graphical icons or keys displayed on a display panel when selected with pointing devices or via touch panels. An apparatus supporting this graphical user interface function is referred to as a "display input device" hereinafter.

Some typical display input devices scale UI parts or change the number of UI parts to be displayed on a display panel in accordance with a change of screen size or resolution of the display panel.

The UI parts displayed in an application menu are classified into two types: UI parts to be scaled to fit the change of the screen size and UI parts of which number is to be decreased or increased in accordance with the change of the screen size. For example, a preview image is to be scaled to fit the screen size. By contrast, in a case where a plurality of UI parts belonging to the same category such as virtual keys such as "Select tray 1", "Select tray 2" are displayed, the number of these UI parts is to be decreased or increased in accordance with the screen size.

When both types of UI parts are displayed on the display screen, the scaling operation and the number increase/decrease operation are performed in combination.

SUMMARY

A display input device includes a display panel, a memory, and circuitry. The display panel displays a screen thereon, the screen including a plurality of display areas. The memory stores specification information, graphical user interface (GUI) information, and layout information. The specification information includes information on at least one of a size and a resolution of the screen displayed on the display panel. The GUI information includes information on a plurality of GUIs to be displayed on the screen, the plurality of GUIs being classified into a plurality of groups of GUIs. The layout information indicates how the plurality of groups of GUIs are to be arranged on the screen when displayed, the layout information associating each one of the plurality of display areas of the screen with one group of the plurality of GUIs to be displayed on each display area. The circuitry is configured to scale each display area in accordance with a change in the size or the resolution of the screen displayed on the display panel. The circuitry is further configured to change one of a size of at least one GUI to be displayed in the scaled display area and a number of GUIs to be displayed in the scaled display area.

BRIEF DESCRIPTION I/F THE DRAWINGS

A more complete appreciation of the disclosure and many of the attendant advantages and features thereof can be readily obtained and understood from the following detailed description with reference to the accompanying drawings, wherein:

FIG. 8 is an example table of the layout information corresponding to the layout illustrated in FIG. 7;

FIG. 9 is an example table of UI part information on the UI parts displayed on the display screen illustrated in FIG. 7;

FIG. 13 is an example table of the layout information corresponding to one of the display areas illustrated in FIG. 12B;

FIG. 14 is an example table of the UI part information on the UI parts displayed in one of the display areas illustrated in FIG. 12B;

FIGS. 20A to 20E are an illustration for explaining an operation of allowing a user to select one of the two examples of operation illustrated in FIGS. 18A to 18C and FIGS. 19A to 19C;

Figure 27:
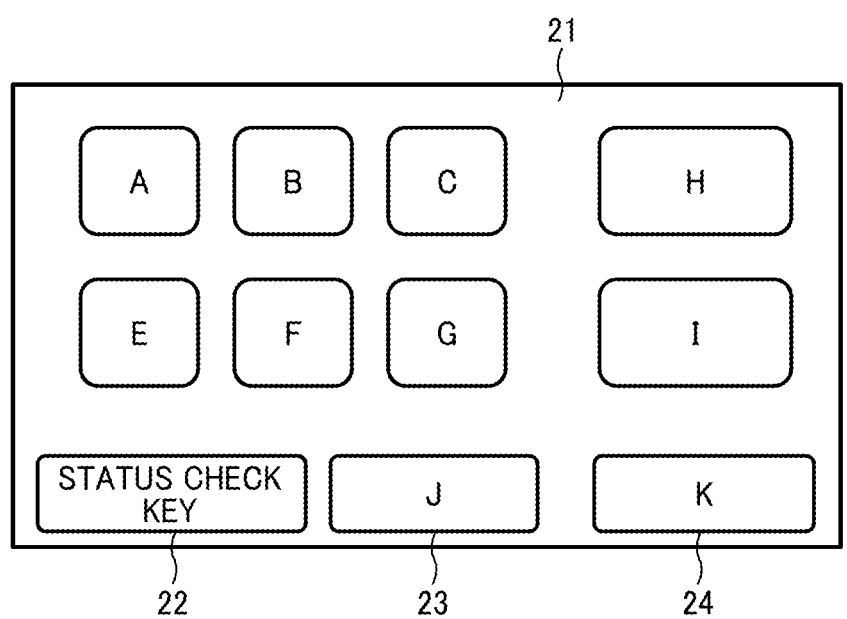
Figures 29, 30, 31:
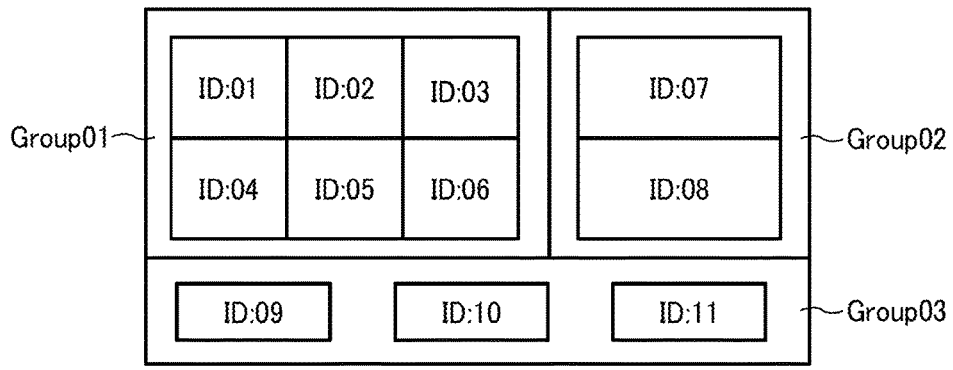

FIGS. 24A to 24D each is a view illustrating a menu that allows a user to enter the hardware information according to another embodiment of the present invention;

FIG. 25A to 25D each is a view illustrating another menu that allows a user to enter the hardware information according to another embodiment of the present invention;

FIG. 26 is a flowchart illustrating an operation of flipping the layout of the UI parts according to another embodiment of the present invention;

FIG. 27 is a view illustrating an example of the layout of the display screen according to another embodiment of the present invention;

FIG. 28 is an example table of the layout information corresponding to the layout illustrated in FIG. 27;

FIG. 29 is a view illustrating the display screen on which the layout information illustrated in FIG. 28 is visually represented;

FIG. 30 is an example table of the UI part information on the UI parts displayed on the display screen illustrated in FIG. 27, and FIG. 31 is an example table of the hardware part information according to another embodiment of the present invention.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Several exemplary embodiments of the present invention will be described hereinafter with reference to drawings.

FIGS. 1A to 1D are an illustration for explaining how UI parts are displayed on a display panel of a display input device when a screen size (panel size) is enlarged according to an embodiment of the present invention.

According to this embodiment, a plurality of UI parts, which are GUIs, displayed on a screen of the display panel of the display input device are classified into a plurality of groups based on specification information on screen size or resolution of the display panel, layout information, and information on the plurality of UI parts. Further, different display areas are respectively assigned to the plurality of groups. When the size or the resolution of the display panel is changed, respective ones of the plurality of display areas are scaled accordingly. The sizes or the number of the UI parts is changed group by group in each of the scaled display areas.

In the following description, the "resolution" indicates the number of pixels (dots) two-dimensionally arrayed on a display of a dot matrix type. Specifically, the resolution is represented by the product of the number of pixels in the width and the height, such as 640*840, 1024*600, and 1280*800.

An aspect ratio indicates the ratio of the number of pixels in the width to the number of pixels in the height. If the screen size is same, the higher the screen resolution, the higher the definition of display. If the display definition is same, the higher the screen resolution, the larger the screen size. The following description is given assuming that the screen resolution and the screen size are correlated as described above.

Figure 1A:
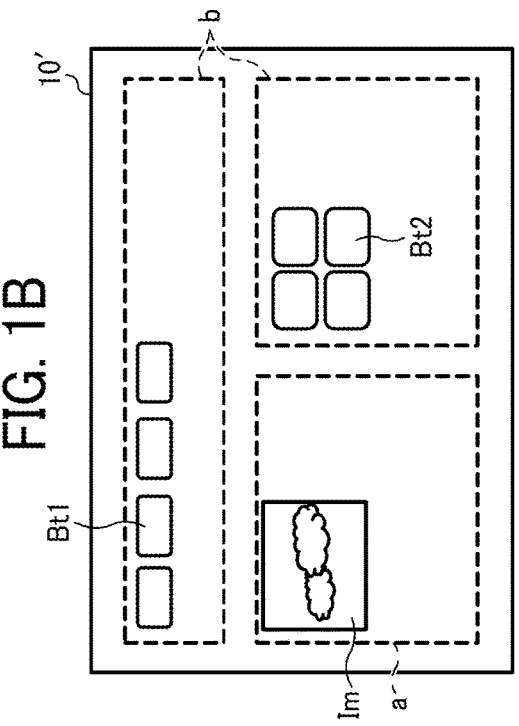
FIGS. 1A to 1D are an illustration for explaining how UI parts are displayed on a display panel of a display input device when a screen size is enlarged according to an embodiment of the present invention.

FIG. 1A illustrates the display panel including a base area 10 having a default size. The base area 10 constitutes an entire area of the display panel. The plurality of UI parts displayed in the base area 10 are classified to three groups, one including a single image part Im, the other two respectively including four key parts Bt1 and four key parts Bt2. The key part Bt1 and the key part Bt2 have sizes different from each other.

A display area including the image part Im belongs to a display area type "a", while both a display area including the four key parts Bt1 and a display area including the four key parts Bt2 belong to a display area type "b". In FIGS. 1A to 1D, the display areas of each of the types "a" and "b" are indicated by a broken line.

The image part Im displayed in the display area of type "a" is a UI part that is to be scaled to fit the change in the screen size. By contrast, the number of the key parts Bt1 and Bt2 displayed in the display area of type 'b' is to be increased or decreased in accordance with the change in the screen size. Thus, the UI parts displayed in the display area of the same type have same attributes. Further, in a case where more than one UI part are displayed in the display area of the same type, the UI parts are arranged in the display area such that the UI parts are adjacent to one another.

Figure 1B:
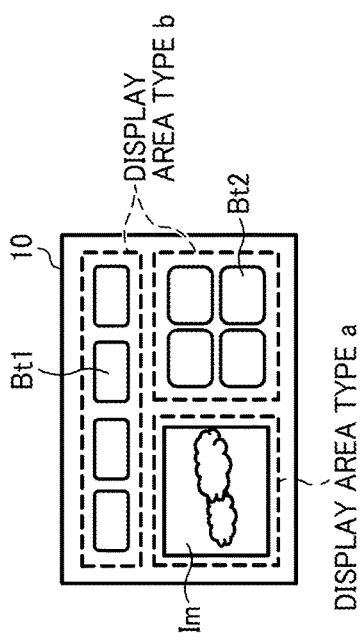

When the base area 10 having the default size (for example, the resolution of 640*480) as illustrated in FIG. 1A is enlarged to the resolution of 1024*600 as illustrated in FIG. 1B, the display areas of types "a" and "b" each is enlarged accordingly.

Figure 1C:
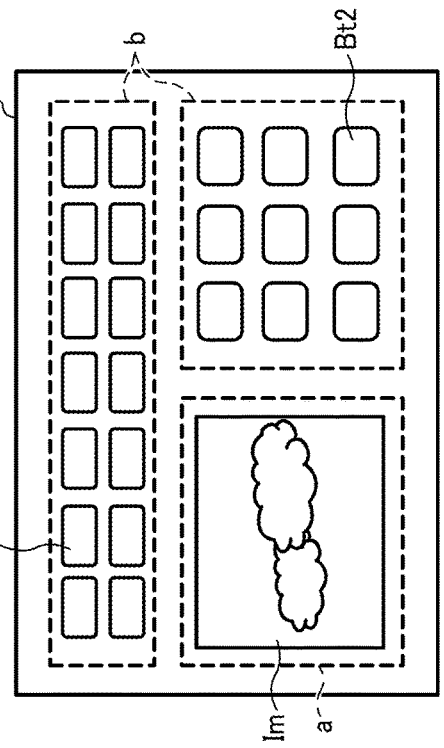

Thereafter, as illustrated in FIG. 1C, the image part Im displayed in the display area of type "a" is enlarged in accordance with the size of the enlarged display area.

Figure 1D:
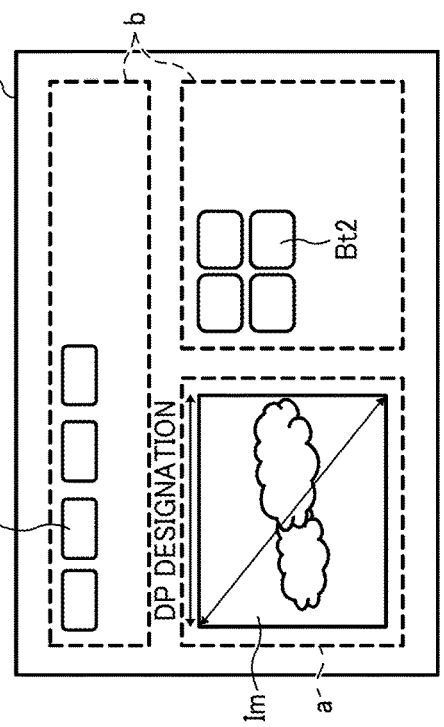

Further, as illustrated in FIG. 1D, the number of the key parts Bt1 in the display area of type "b" and the number of the key parts Bt2 in the display area of type "b" each is increased in accordance with the size of the enlarged display area. In an example illustrated in FIGS. 1C and 1D, the number of the key parts Bt1 increases from 4 to 14, while the number of the key parts Bt2 increases from 4 to 9.

As described above, an operation of changing of the size of the UI part or changing the number of the UI parts to be displayed are performed in each display area of each type after scaling the display area.

Thus, when the screen size (screen resolution) of the display panel of the display input device is changed, the UI part that is to be scaled to fit the screen size is scaled, and the number of UI parts that is to be changed in accordance with the change in the screen size is increased or decreased, while a layout of the entire screen remains unchanged.

Figure 2:
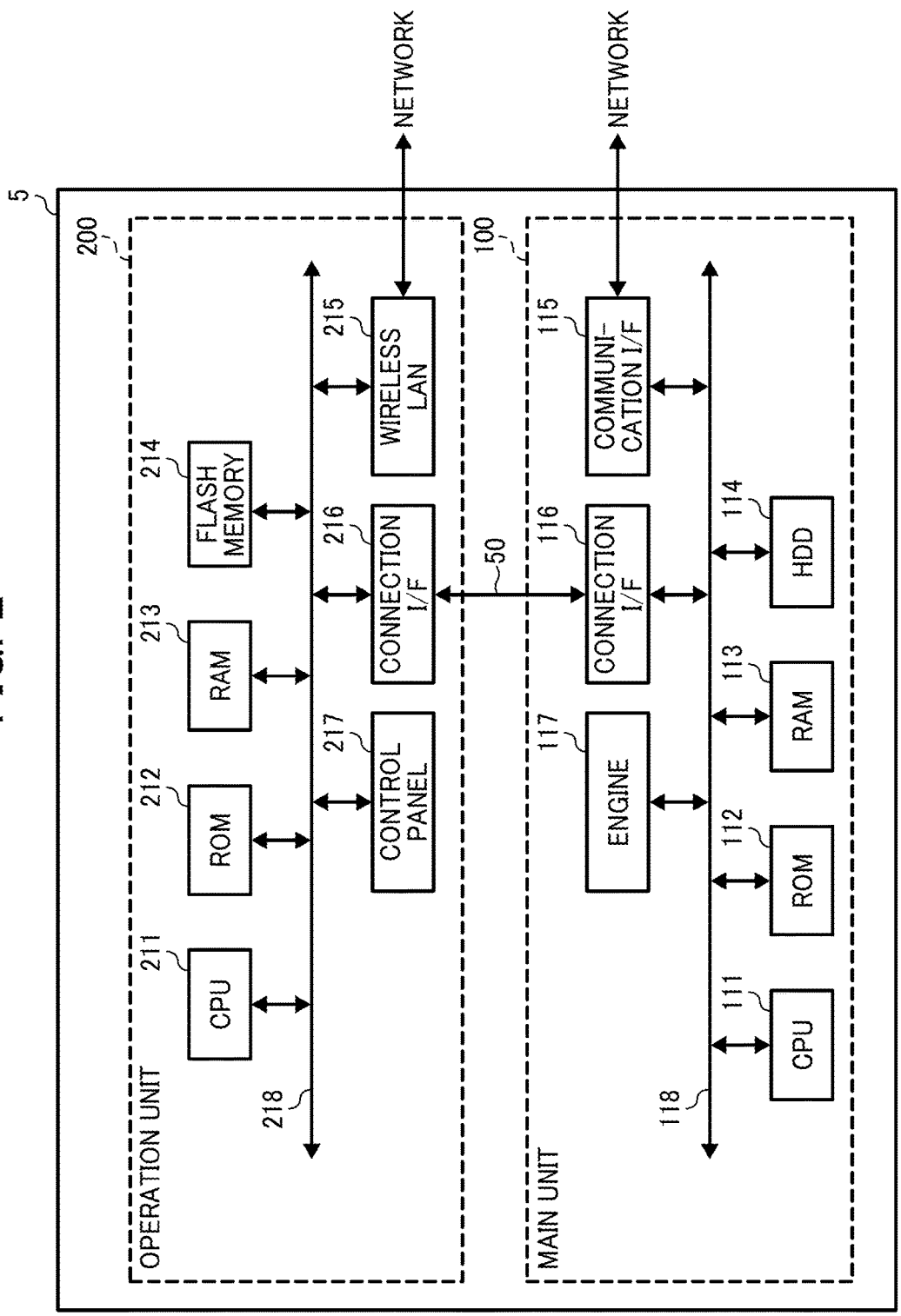
FIG. 2 is a block diagram illustrating a hardware configuration of an image forming apparatus including an operation unit as an example of the display input device according to an embodiment of the present invention.

FIG. 2 is a block diagram illustrating a hardware configuration of an image forming apparatus 5 including an operation unit 200, which is an example of the display input device according to an embodiment of the present invention.

The image forming apparatus 5 is a digital multifunction peripheral that is capable of implementing various functions such as a copier function, a scanner function, a facsimile function, and a printer function. As illustrated in FIG. 2, the image forming apparatus 5 includes a main unit 100 and the operation unit 200 that enables a user to input an instruction. The operation unit 200 is an example of the display input device described above.

The main unit 100 and the operation unit 200 are communicably connected with each other via a dedicated communication path 50. The communication path 50 may be in compliance with a universal serial bus (USB) standard. However, any arbitrary standard, regardless of wired or wireless, may be used as the communication path 50.

The main unit 100 operates in response to a user instruction received by the operation unit 200. The main unit 100 is also capable of communicating with an external apparatus such as a client personal computer (PC) and operating in response to an instruction received from the external apparatus.

First, a description is given of a hardware configuration of the main unit 100 hereinafter. The main unit 100 includes a central processing unit (CPU) 111, a read only memory (ROM) 112, a random access memory (RAM) 113, and a hard disc drive (HDD) 114, which together constitute a microcomputer. The main unit 100 further includes a communication interface (I/F) 115, a connection I/F 116, and an engine 117. Those hardware components are connected to one another via a system bus 118 to communicate signals and data therebetween.

The CPU 111 controls entire operation of the main unit 100. The CPU 111 executes programs stored in the ROM 112 or the HDD 114 using the RAM 113 as a work area. With this configuration, the CPU 111 controls the entire operation of the main unit 100 to implement various functions as the copier function, the scanner function, and the facsimile function, and the printer function.

Further, the RAM 113 temporarily stores data such as image data of a document read by a scanner engine included in the engine 117 or image data to be output by a printer engine.

The communication I/F 115 is an interface for connecting the main unit 100 to a network such as the Internet. The connection I/F 116 is an interface for allowing the main unit 100 to communicate with the operation unit 200 via the communication path 50.

The engine 117 is hardware for performing processing other than data communication and general information processing for implementing the copier function, the scanner function, the facsimile function or the printer function.

The scanner engine scans an image on the document to optically read the image to and converts the read image to image data. For scanning, the document is placed on an exposure glass to be pressed by a pressure plate. Alternatively, an automatic document feeder (ADF) sequentially feeds the document to a scanning position.

The printer engine included in the engine 117a plotter (image forming unit) that forms an image on a sheet material such as paper based on the image data acquired by the scanner engine or the image data received from the external apparatus, and a facsimile unit that performs facsimile communication. The engine unit may further include optional equipment such as a finisher that sorts the printed sheet materials, and a stapler that binds together the printed sheet materials.

Next, a description is given of a hardware configuration of the operation unit 200 hereinafter. As illustrated in FIG. 2, the operation unit 200 includes a CPU 211, a ROM 212, a RAM 213, and a flash memory 214, which together constitute a microcomputer. The operation unit 200 further includes a wireless local area network (LAN) 215, a connection I/F 216, and a control panel 217. Those hardware components are connected to one another via a system bus 218 to communicate signals and data therebetween.

The CPU 211 controls entire operation of the operation unit 200. More specifically, the CPU 211 executes programs stored in the ROM 212 or the flash memory 214 using the RAM 213 as a work area to control entire operation of the operation unit 200. The CPU 211 implements displaying information or images including the UI part as described above in accordance with a user instruction input through the control panel 217.

The flash memory 214 is a nonvolatile memory, which holds necessary programs or data even after the image forming apparatus 5 is turned off.

The wireless LAN 215 is an interface for connecting the operation unit 200 to a network such as the Internet. The connection I/F 216 is an interface for allowing the operation unit 200 to communicate with the main unit 100 via the communication path 50.

With this configuration, the wireless LAN 215 connects the operation unit 200 directly to the network in addition to the connection through the communication path 50 and the main unit 100.

The control panel 217 receives various instructions or selections in response to user operation and displays various information, such as information corresponding to the received instructions or selections, information indicating an operational status of the image forming apparatus 5, and information indicating a setting status.

The control panel 217 includes a display panel and an input device for allowing the user to give instructions or selections via information such as the GUI displayed on the display panel. The control panel 217 is implemented by a liquid crystal display (LCD) having a touch panel, however, such a LCD is exemplary. Alternatively, for example, the control panel 217 may be implemented by an organic electro luminescence (EL) display having a touch panel. Instead of or in addition to the touch panel, an operation unit such as a pointing device and hardware keys and/or a display unit such as an indicator lamp may be provided.

Hereinafter, a description is given of an example software configuration of the image forming apparatus 5 with reference to FIG. 3.

Figure 3:
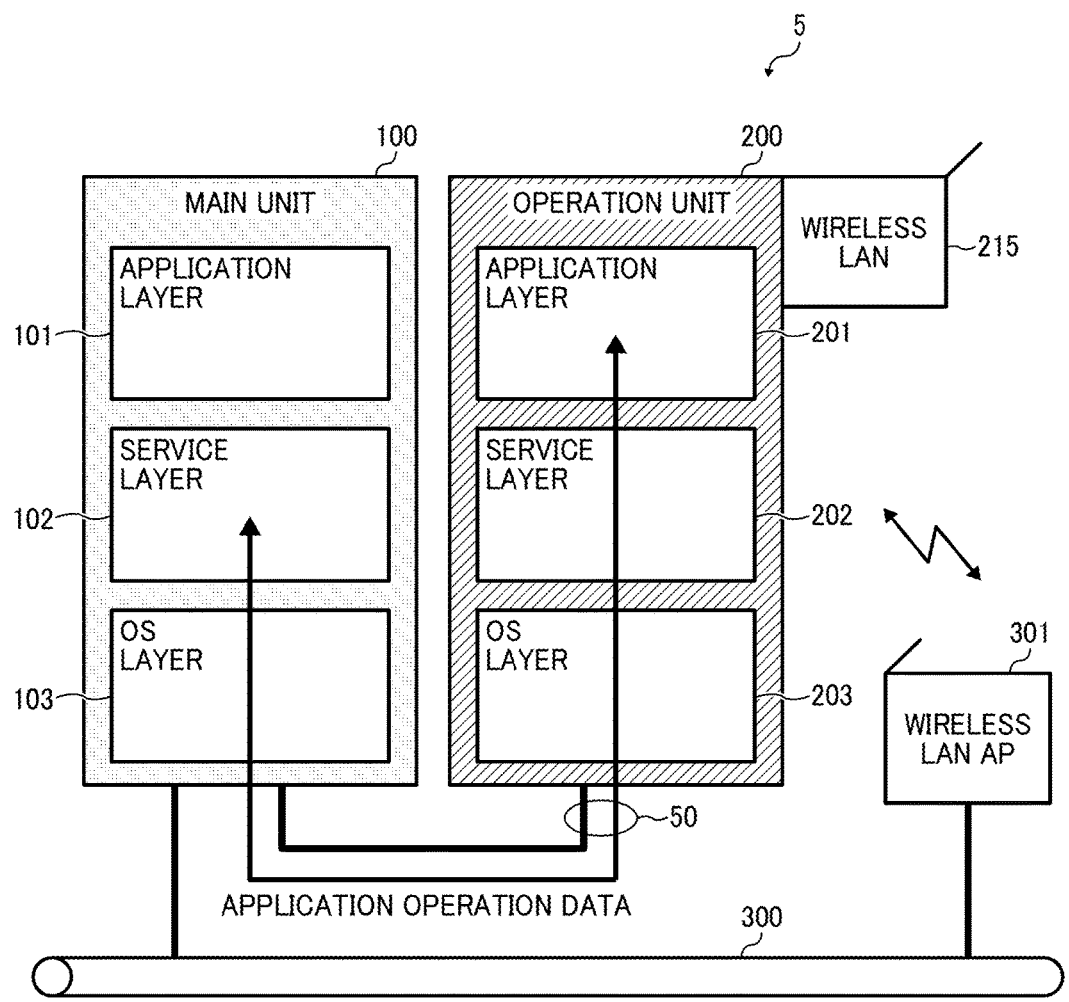
FIG. 3 is a block diagram illustrating a software configuration of the image forming apparatus according to an embodiment of the present invention.

As illustrated in FIG. 3, the main unit 100 includes an application layer 101, a service layer 102 and an OS layer 103. The entities of the application layer 101, the service layer 102 and the OS layer 103 are various types of software stored in the ROM 112 or the HDD 114. The CPU 111 executes that software to implement the function of each layer.

The software of the application layer 101 is application software that causes hardware resources to operate so as to provide predetermined functions. The application software may be referred to as simply an "application" hereinafter. Examples of the application include a copy application that provides a copier function, a scanner application that provides a scanner function, a facsimile application that provides a facsimile function, and a printer application that provides a printer function.

The software of the service layer 102, which is provided between the application layer 101 and the OS layer 103, provides each application with an interface for using the hardware resources of the main unit 100. More specifically, the software for the service layer 102 provides the functions of receiving the operation requests to the hardware resources and mediating the operation requests.

Examples of the operation requests received by the service layer 102 include a request for scanning an image by the scanner engine of the engine 117 and a request for printing by the printer engine.

The interface function by the service layer 102 may be also provided to an application layer 201 of the operation unit 200 as well as the application layer 101 of the main unit 100. In other words, the application layer 201 of the operation unit 200 is also capable of implementing functions for utilizing the hardware resources such as the engine 117 of the main unit 100 via the interface function of the service layer 102 of the main unit 100.

The software of the OS layer 103 is basic software (the operating system) that provides basic functions of controlling the hardware of the main unit 100. The software of the service layer 102 converts each of the requests received from various applications for using the hardware resources, to a command that is interpretable by the OS layer 103. The software of the service layer 102 passes the command to the OS layer 103. The software of the OS layer 103 executes the command to allow the hardware resources to operate in accordance with the request by the application.

The operation unit 200 similarly includes the application layer 201, a service layer 202 and an OS layer 203. The application layer 201, the service layer 202 and the OS layer 203 of the operation unit 200 has a similar layer structure to that of the main unit 100. However, the functions provided by the application of the application layer 201 and the operation requests to be received by the service layer 202 are different from those of the main unit 100.

The application of the application layer 201 may be software that causes hardware resources of the operation unit 200 to operate so as to implement predetermined functions. In the meantime, the application of the application layer 201 is mainly software for implementing a user interface (UI) function for operating or displaying functions that the main unit 100 includes, such as the copier function, the scanner function, the facsimile function, and the printer function.

In this embodiment, the software of the OS layer 103 that the main unit 100 includes and the software of the OS layer 203 that the operation unit 200 includes are different from each other in order to maintain the independency of functions. In other words, the main unit 100 and the operation unit 200 operate independently with each other on separate operating systems. For example, Linux (registered trademark) may be used as the software of the OS layer 103 of the main unit 100, whereas Android (registered trademark) may be used as the software of the OS layer 203 of the operation unit 200.

A wireless LAN application 301 is an application for connecting the wireless LAN 215 of the operation unit 200 to the Internet 300 through a wireless LAN.

As described above, in the image forming apparatus 5, which is implemented by the digital MFP, the main unit 100 and the operation unit 200 respectively operate on different operating systems. Accordingly, communication between the main unit 100 and the operation unit 200 is conducted as communications between separate apparatuses, instead of communication within a common apparatus. Examples of the communication between the main unit 100 and the operation unit 200 include command communication, which is an operation of transmitting the information (e.g., instruction contents) received by the operation unit 200 to the main unit 100. Examples of the communication between the main unit 100 and the operation unit 20 further include an operation by the main unit 100 of notifying the operation unit 200 of an event.

In this embodiment, the operation unit 200 communicates commands to the main unit 100 to use the functions of the main unit 100. Examples of the events reported from the main unit 100 to the operation unit 200 include an execution status of operation in the main unit 100 and contents that are set in the main unit 100.

In this embodiment, power is supplied from the main unit 100 to the operation unit 200 via the communication path 50. Accordingly, the power control of the operation unit 200 may be performed separately (independently) from the power control of the main unit 100.

The operation unit 200 may be implemented by a tablet-type display input device that is detachably attached to the main unit 100.

Hereinafter, a description is given of a functional configuration of the operation unit 200 as an example of the display input device according to an embodiment of the present invention.

Figure 4:
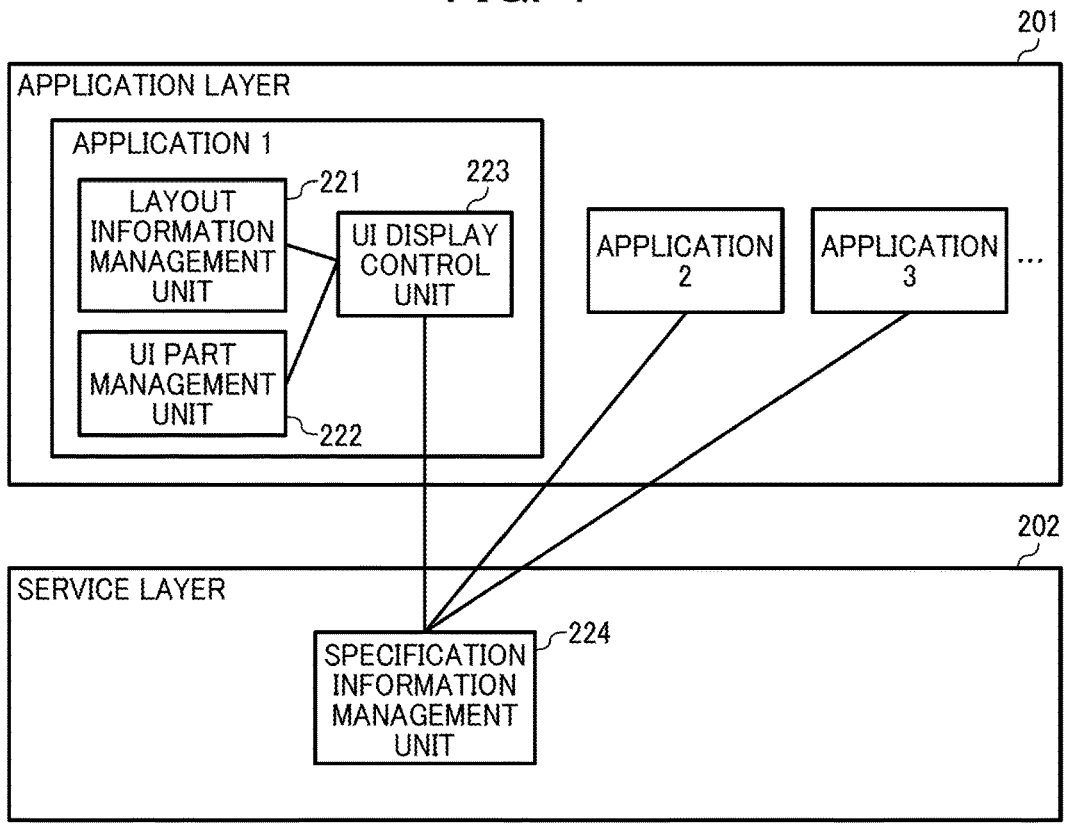
FIG. 4 is a block diagram illustrating a functional configuration of the operation unit illustrated in FIGS. 2 and 3.

FIG. 4 is a block diagram illustrating a functional configuration of the operation unit 200 illustrated in FIGS. 2 and 3.

The application layer 201 of the operation unit 200 includes a plurality of applications such as Application 1, Application 2, and Application 3. As described above, each of the applications of the application layer 201 is software for implementing the user interface (UI) function for operating or displaying functions that the main unit 100 includes, such as the copier function, the scanner function, the facsimile function, and the printer function.

The Applications 1 to 3 each includes a layout information management unit 221, a UI part management unit 222, and a UI display control unit 223. In this disclosure, the layout information management unit 221, UI part management unit 222, and UI display control unit 223 correspond to a function or an operation to be performed by the CPU 211, in cooperation with any desired memory of the operation unit 200.

Further, the service layer 202 includes a specification information management unit 224 that manages specification information such as the screen size or the resolution of the display panel, which is stored in the memory.

The layout information management unit 221 manages layout information indicating how the UI parts are to be arranged on the display screen, which is stored in the memory. For example, when the UI parts are arranged on the display screen as illustrated in FIG. 5, the layout information management unit 221 stores the layout information as illustrated in FIG. 6.

Figure 5:
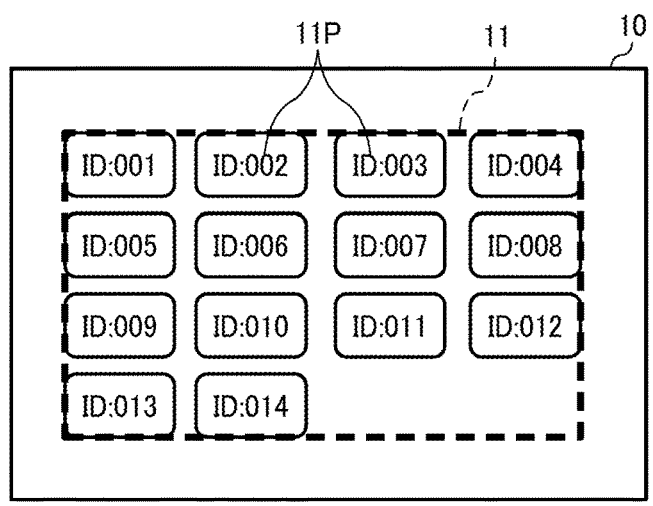
FIG. 5 is a view illustrating an example of a layout of a display screen of a control panel of the operation unit according to an embodiment of the present invention.
Figures 6, 7:
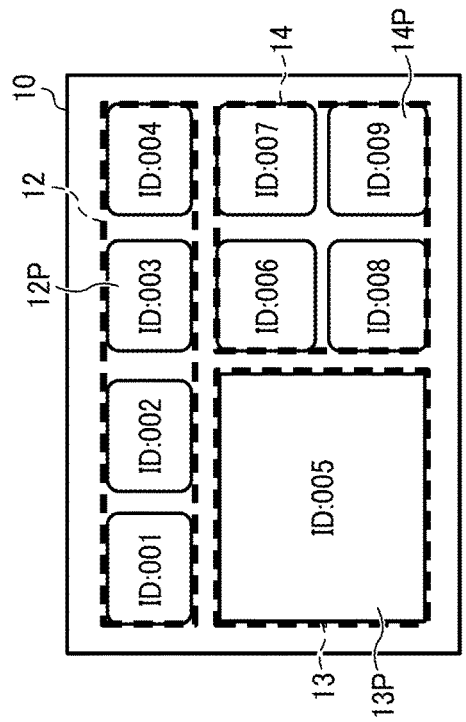
FIG. 6 is an example table of layout information corresponding to the layout illustrated in FIG. 5.
FIG. 7 is a view illustrating another example of the layout of the display screen of the control panel of the operation unit according to an embodiment of the present invention.

More specifically, as illustrated in FIG. 6, for the base area 10, which constitutes an entire area of the display screen as illustrated in FIG. 5, the layout information management unit 221 stores, in association with an ID "Base_0001" for identifying the base area 10, a start coordinate "0, 0", and a size "1024*600". For a display area 11 indicated by a broken line in FIG. 5, the layout information management unit 221 stores, in association with an ID "Disp_001", a start coordinate "10, 15", a size "1004*570", and a type "number increase/decrease type". For UI parts 11P arranged in the display area 11, the layout information management unit 221 stores, in association with IDs "UI_001" to "UI_014", respectively, a display area to which each UI parts belong to. The UI parts 11P are key parts having a common property of the number increase/decrease type. The UI parts 11P are arranged adjacent to one another. The UI parts 11P each is associated with an attribute information indicating that the UI part 11P belongs to the display area "Disp_001" as illustrated in FIG. 6.

As another example, when the UI parts are arranged on the display screen as illustrated in FIG. 7, the layout information as illustrated in FIG. 8 is stored in the layout information management unit 221. In FIG. 7, each of display areas 12 to 14 is indicated by a broken line while each UI part 12P arranged in the display area is indicated by a solid line.

More specifically, as illustrated in FIG. 8, for the base area 10, which constitutes an entire area of the display screen as illustrated in FIG. 7, the layout information management unit 221 stores, in association with an ID "Base_001" for identifying the base area 10, a start coordinate "0, 0", and a size "1024*600". For the display area 12, the layout information management unit 211 stores, in association with an ID "Disp_001", a start coordinate "10, 15", a size "1004*8", and a type "number increase/decrease type". For four UI parts 12P arranged in the display area 12, the layout information management unit 211 stores, in association with IDs "UI_001" to "UI_004" respectively, the attribute information indicating that the UI parts 12P each belong to the display area "Disp_001". The UI parts 12P are key parts having a common property of the number increase/decrease type, which are arranged adjacent to one another.

For the display area 13, the layout information management unit 221 stores, in association with an ID "Disp_0002", a start coordinate "10, 120", a size "500*450", and a type "scaling type". A single UI part 13P is arranged in the display area 13. The UI part 13P is an image part having a property of the scaling type. As illustrated in FIG. 8, for the UI part 13P, the layout information management unit 221 stores, in association with an ID "UI_005", an attribute information indicating that the UI part 13P belongs to the display area "Disp_002".

For the display area 14, the layout information management unit 221, stores, in association with an ID "Disp_0003", a start coordinate "505, 120", a size "500*450", and a type "number increase/decrease type". As illustrated in FIG. 8, for four UI parts 14P arranged in the display area 14, the layout information management unit 221 stores, in association with IDs "UI_006" to "UI_009" respectively, the attribute information indicating that that each UI part 14P belongs to the display area "Disp_003". The four UI parts 14P are key parts having a common property of the number increase/decrease type, which are arranged adjacent to one another.

The UI part management unit 222 illustrated in FIG. 4 manages information on a plurality of UI parts, stored in the memory, according to an application function. For example, when the UI parts are arranged on the display screen as illustrated in FIG. 7, UI part information as illustrated in FIG. 9 is stored in the UI part management unit 222.

As illustrated in FIG. 9, for each of the UI parts 12P, the UI part management unit 222 stores, in association with the IDs "UI_001" to "UI_004", an attribute information indicating that the size is "100*80" and a type is "key". Further, as illustrated in FIG. 9, for the UI parts 13P, the UI part management unit 222 stores, in association with the ID "UI_005", an attribute information indicating that the size is "500*450", a type is "image", and a file name is "image.png".

Furthermore, for each of the UI parts 14P, the UI part management unit 222 stores, in association with the IDs "UI_006" to "UI_009", an attribute information indicating that the size is "100*90" and a type is "key".

In the layout information and the UI part information described above, the size is indicated by the resolution. Specifically, the numerical values of the start coordinate and the size of each area or each UI part represent the number of pixels in the width and the number of pixels in the height, with the upper-left corner of the base area 10 illustrated in FIG. 5 or FIG. 7 as the origin. However, these numerical values are exemplary, and do not completely correspond to the position or size in the base area 10.

The UI part display control unit 223 refers to the specification information acquired from the specification information management unit 224, the layout information acquired from the layout information management unit 221, and the UI part information acquired from the UI part management unit 222. Further, the UI display control unit 223 displays the UI parts according to the screen size or the resolution while the layout of the entire display screen remains unchanged.

The specification information management unit 224 included in the service layer 204 manages the specification information such as the screen size or the resolution of the display panel, which is stored in memory. The specification information further includes information on a capacity of the RAM or the NAND memory.

Furthermore, the UI part display control unit 223 classifies the plurality of UI parts to a plurality of groups according to the specification information on the screen size or the resolution of the display panel, the layout information, and the information on the plurality of UI parts. The UI part display control unit 223 assigns different display areas respectively to the plurality of groups. When the screen size or the resolution of the display panel is changed, the UI part display control unit 223 scales each display area in accordance with the changed screen size or resolution. The size or the number of the UI parts is changed group by group in each of the scaled display areas.

Still further, in this embodiment, the UI part display control unit 223 defines the display areas classified into a plurality of groups based on the attribute information included in the UI part information and the attribute information included in the layout information.

In this case, the UI display control unit 223 may classify the plurality of UI parts based on the attribute information indicating whether the type of the UI part is the scaling type or the number increase/decrease type.

Hereinafter, a description is given of an operation of displaying the UI parts in accordance with the screen size of the display panel, performed by the operation unit 200 with reference to the flowchart of FIG. 10.

Figure 10:
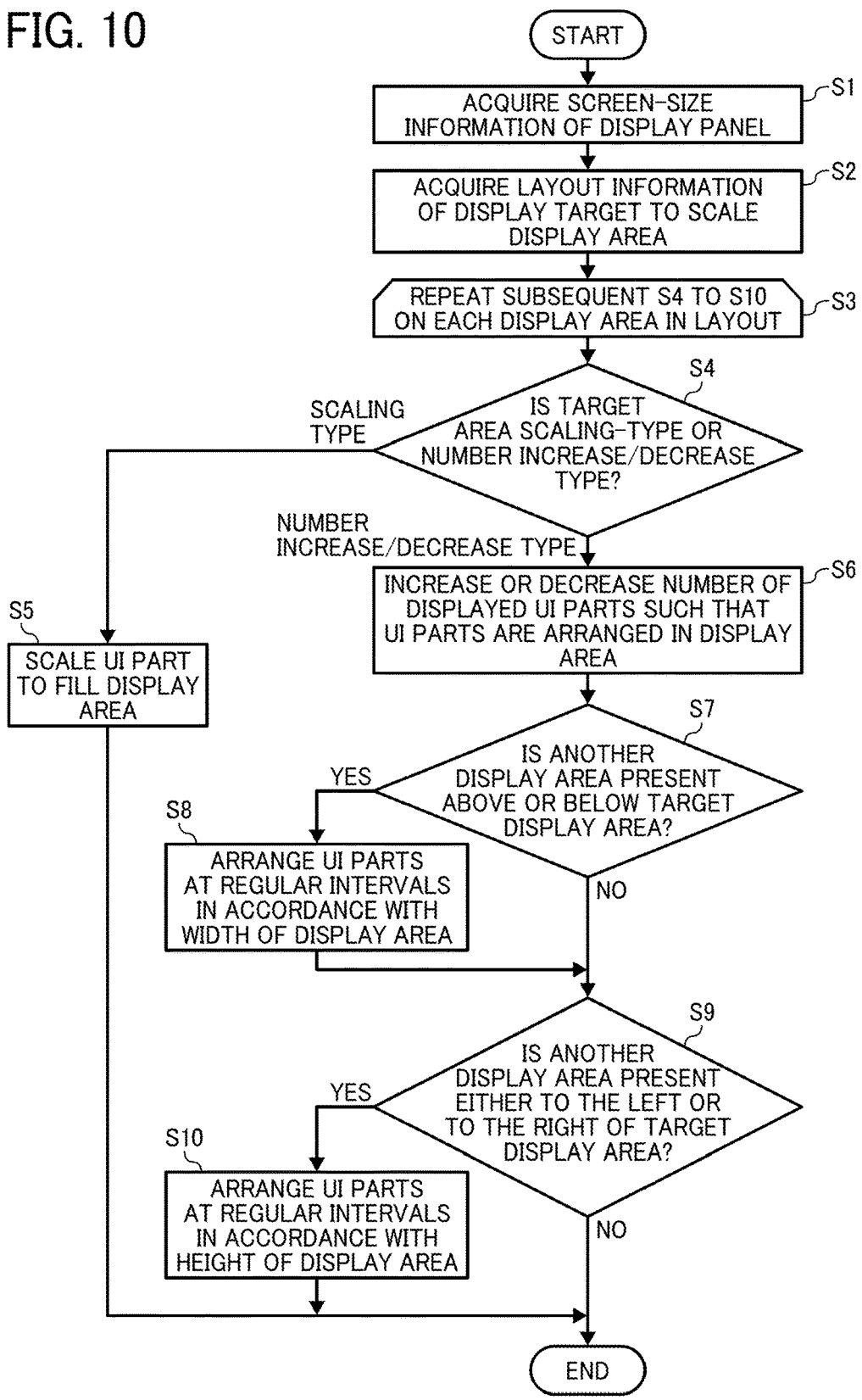
FIG. 10 is a flowchart illustrating an operation of displaying the UI parts in accordance with the screen size of the display panel, performed by the display input device according to an embodiment of the present invention.

The CPU 211 of the operation unit 200 controls the display panel of the control panel 217 according to a program stored in the ROM 212 to implement the operation of FIG. 10.

First, the CPU 211 acquires the information on the screen size of the display panel at S1. Specifically, the UI part display control unit 223 of the application layer 201 acquires, from the specification information management unit 224 of the service layer 202, information on the screen resolution corresponding to the screen size of the display panel to be used.

At S2, the CPU 211 acquires the layout information of a display target to scale each display area. Specifically, the UI part display control unit 223 of the application layer 201 acquires, from the layout information management unit 221, the layout information of the display target to scale (enlarge or reduce) each display area in accordance with the screen size of the display panel to be used.

Figure 11A:
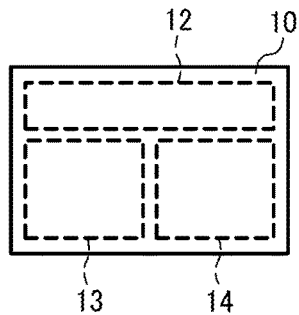
FIGS. 11A and 11B are an illustration for explaining an operation of scaling each display area in accordance with a size of a base area according to an embodiment of the present invention.
Figure 11B:
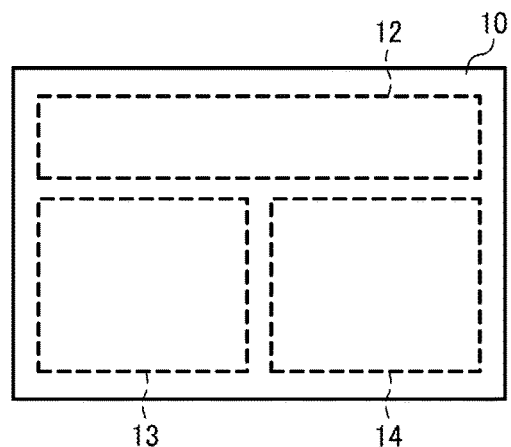

More specifically, the UI part display control unit 223 scales each of the display areas 12 to 14 in accordance with the size (resolution) of the base area 10 on the display panel as indicated by a broken line in FIGS. 11A and B. The base area 10 illustrated in FIG. 11A has a default size storing the layout information and the UI part information in advance. The base area 10 illustrated in FIG. 11B has a screen size in which the UI part are actually displayed.

The CPU 211 performs the processing from S4 to S10 on each of the display areas in the layout (S3). Specifically, the UI part display control unit 223 of the application layer 201 performs the processing from S3 to S11.

Figure 12A:
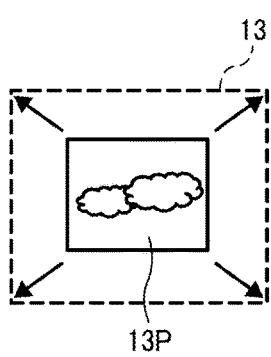
FIGS. 12A and 12B are an illustration for explaining enlarging the UI part, which is an image part, such that the enlarged display area is filled with the UI part according to an embodiment of the present invention.

At S4, the UI part display control unit 223 determines whether the type of a target display area is the scaling type or the number increase/decrease type. When the UI part display control unit 223 determines that the type of the target display area is the scaling type, the processing proceeds to S5. At S5, the UI part display control unit 223 enlarges the UI part 13P, which is the image part, such that the display area 13 is filled with the UI part 13P, as illustrated in FIG. 12A.

At S5, for example, assuming that the size of the display area 13 is 500*450 and the default size of the UI part 13P belonging to the display area 13 is 250*200, the UI part 13P is enlarged to 500*400. In other words, the UI part of the scaling type may be enlarged with its aspect ratio unchanged.

When the UI part display control unit 223 determines that the type of the target display area is the number increase/decrease type, the processing proceeds to S6. At S6, the UI part display control unit 223 increases or decreases the number of the UI parts to be displayed in the display area to the maximum number that can be arranged in the display area that has been enlarged at S2.

Figure 12B:
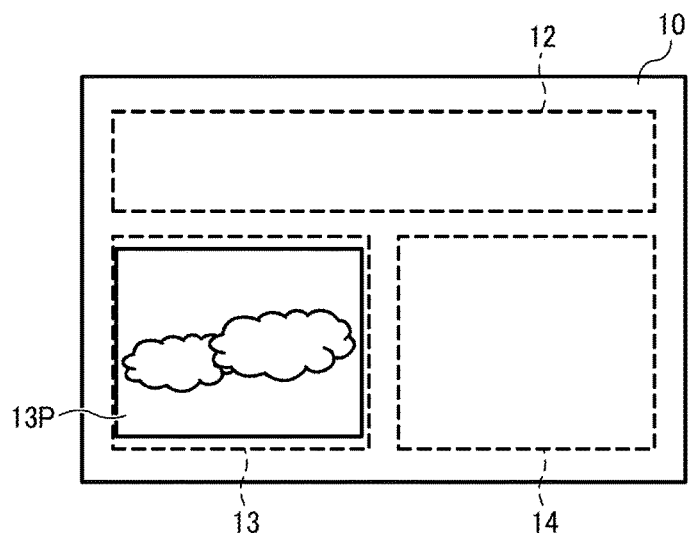

FIG. 13 is an example of the layout information on the display area 12 illustrated in FIG. 12B. FIG. 14 is an example of the UI part information on the UI parts to be displayed in the display area 12. According to the layout information of FIG. 13 and the UI part information of FIG. 14, fourteen of the UI parts 12P specified by the IDs UI_001 to UI_014, each having a size of 150*80, are arranged in the display area 12 having a size of 1450*180, as illustrated in FIG. 15.

Figure 15:
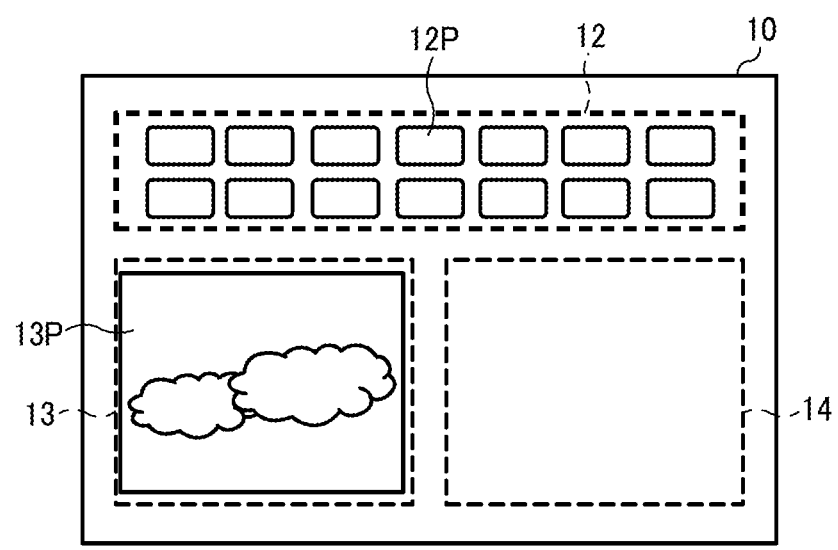
FIG. 15 is a view illustrating the display screen on which a single UI part is arranged in one of the enlarged display areas and a plurality of the UI parts are arranged in another one of the enlarged display area according to an embodiment of the present invention.

In FIG. 15, the UI part 13P, which is an image, is displayed enlarged in the display area 13 of the number increase/decrease type. Further, in FIG. 15, the increased number of the UI parts 12P, which are keys, are arranged in the display area 12 of the number increase/decrease type.

The processing returns to S4 to determine the type of the display area 14, which is indicated by a broken line in FIG. 15. As the display area 14 is also the number increase/decrease type, the processing proceeds to S6. At S6, the UI display control unit 223 increases the number of the UI parts (corresponding to the UI parts 14P illustrated in FIG. 7) to be displayed in the display area 14 to display the increase number of the UI parts 14P.

At S7, the UI display control unit 223 determines whether another display area is arranged above or below the target display area. When the UI part display control unit 223 determines that another display area is arranged above or below the target display area (S7: YES), the processing proceeds to S8. At S8, the UI part display control unit 223 arranges the UI parts at regular intervals such that the left edge of the UI part and the right edge of the UI part respectively align with both sides of the display area.

Figure 16A:
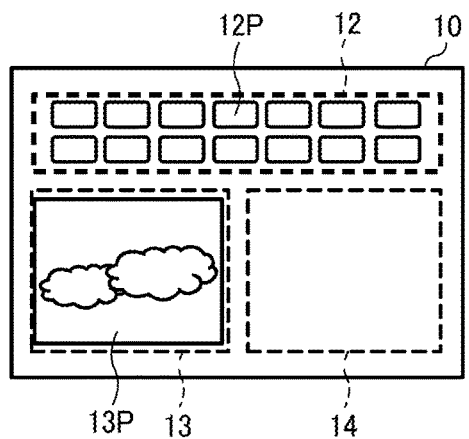
FIGS. 16A and 16B are an illustration for explaining an operation of arranging the UI parts at regular intervals such that the right edge of the UI part and the left edge of the UI part respectively align with both sides of the display area according to an embodiment of the present invention.
Figure 16B:
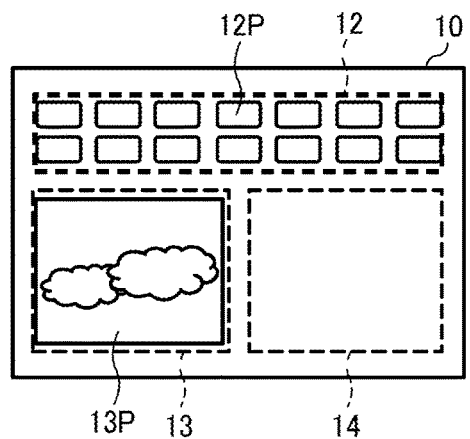

For example, as illustrated in FIG. 16A, the display area 13 and the display area 14 are arranged below the display area 12, which is the target display area. In this case, as illustrated in FIG. 16B, the UI parts 12P are aligned at regular intervals in the display area 12 such that the left edge of the UI part 12P and the right edge of the UI part 12P respectively align with both sides of the display area 12.

After S8, or when the UI part display control unit 223 determines that no display area is arranged above or below the target display area (S7: NO), the processing proceeds to S9. At S9, the UI part display control unit 223 determines whether another display area is arranged to the left or right of the target display area. When the UI part display control unit 223 determines that another display area is arranged to the left or right of the target display area (S9: YES), the processing proceeds to S10. At S10, the UI part display control unit 223 arranges the UI parts at regular intervals such that the top edge of the UI part and the bottom edge of the UI part respectively align with both the top and the bottom of the display area.

Figure 17A:
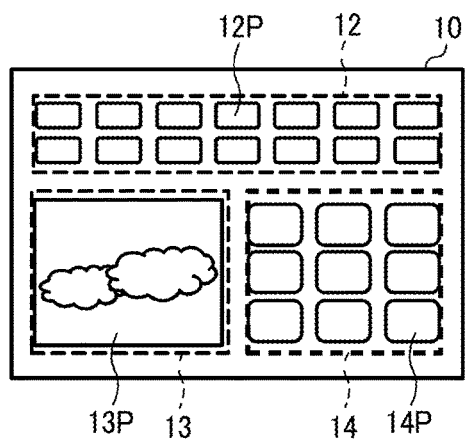
FIGS. 17A and 17B are an illustration for explaining an operation of arranging the UI parts at regular intervals such that the top edge of the UI part and the bottom edge of the UI part respectively align with both the top and the bottom of the display area according to an embodiment of the present invention.
Figure 17B:
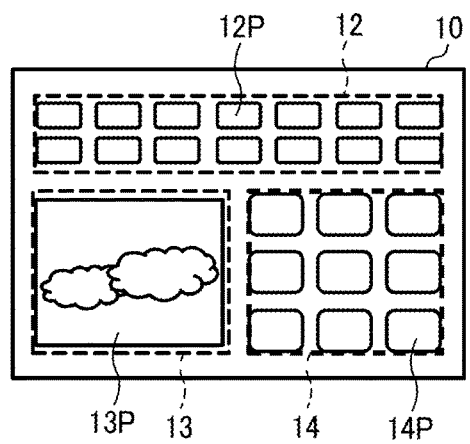

For example, as illustrated in FIG. 17A, the display area 13 is arranged to the left of the display area 14, which is the target display area. In this case, as illustrated in FIG. 17B, the UI parts 14P are aligned at regular intervals in the display area 14 such that the top edge of the UI part 14P and the bottom edge of the UI part 14P respectively align with both the top and the bottom of the display area 14.

Further, as the display area 12 is arranged above the display area 14, the UI parts 14P are aligned at regular intervals in the display area 14 such that the left edge of the UI part 14P and the right edge of the UI part 14P respectively align with both sides of the display area 14 at S8.

The CPU 211 performs the processing from S4 to S10 on each of the display area in the layout. In an example illustrated in FIGS. 11A and 11B, as the layout includes the three display areas 12 to 14, the CPU 211 repeats the processing from S4 to S10 three times.

In this embodiment, the display area in which the image part is displayed is defined as the display area of scaling type, while the display area in which one or more key parts are displayed is defined as the display area of number increase/decrease type, however, such classification is exemplary. Alternatively, a plurality of image parts may be grouped, and a display area in which the group of image parts is displayed may be defined as the display area of number increase/decrease type. Further alternatively, a display area in which one or more key parts are displayed may be defined as the display area of scaling type.

In other words, the type of the display area is determined depending on whether the UI part displayed in the display area has the property of scaling type or the property of the number increase/decrease type. The number of the UI parts having the property of number increase/decrease type is to be changed. The UI part having the property of scaling type is to be enlarged or reduced.

Heretofore, a description has been made of a case where the screen size of the display panel is enlarged from the default size (the resolution is raised). By contrast, the screen size may be reduced from the default size (the resolution is reduced).

In this case, the size of the UI part displayed in the display area of scaling type is reduced in accordance with the reduction of the display area. Further, the number of UI parts displayed in the display area of number increase/decrease type is decreased in accordance with the reduction of the display area.

However, in a case where the display area of number increase/decrease type is reduced in size such that either one or both of the width and the height of the display area is shorter than those of the UI part to be displayed, even a single UI part cannot be displayed in the display area. In addition, a predetermined number of UI parts required to be collectively displayed may not be displayed collectively if the reduced display area is not large enough.

Hereinafter, a description is given of examples of an operation performed by the UI display control unit 223 in a case where the display area is reduced in size in accordance with the reduction of the screen size as described above.

Figure 18A:
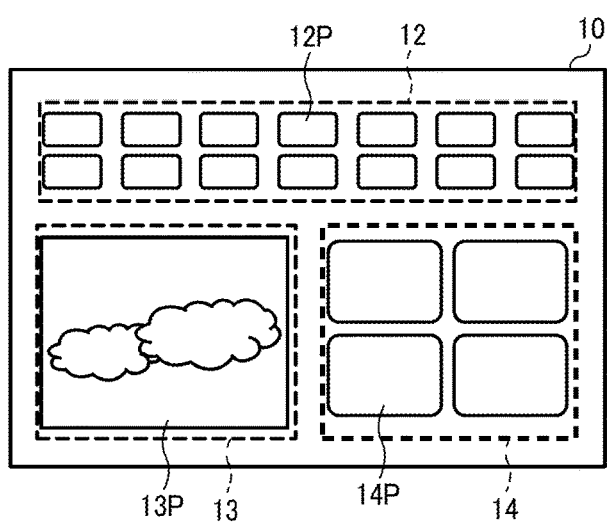
FIGS. 18A to 18D are an illustration for explaining an example of operation performed when the display area is reduced in size in accordance with the reduction of the screen size according to an embodiment of the present invention.
Figure 18B:
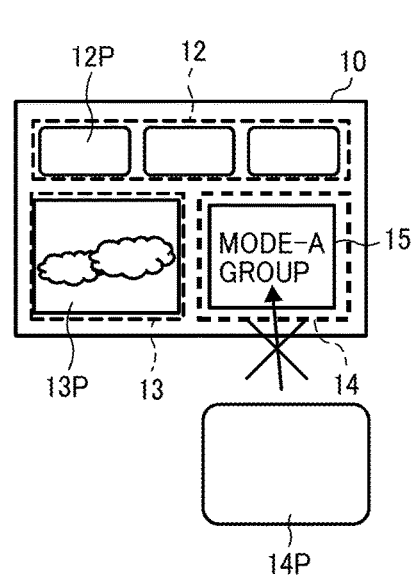
Figure 18C:
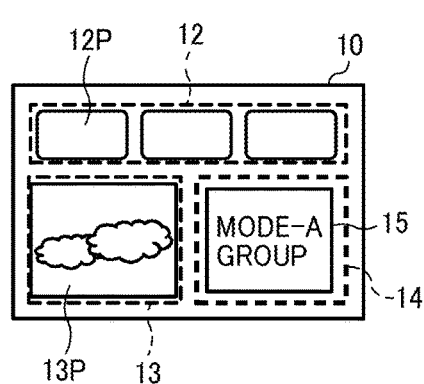

FIGS. 18A to 18C are an illustration for explaining one example process performed when the display area is reduced in size in accordance with the reduction of the screen size.

FIG. 18A illustrates an example layout of the display panel having a default size, while FIG. 18B illustrates an example layout where the screen size (the base area 10) is reduced. As illustrated in FIGS. 18A and 18B, the number of UI parts 12P in the display area 12, which is the number increase/decrease type, is decreased from 14 to 3 in accordance with the reduction of the display area 12. Further, a size of the UI part 13P in the display area 13, which is the scaling type, is reduced in accordance with the reduction of the display area 13. By contrast, as illustrated in FIG. 18B, even a single UI part 14P cannot be arranged in the reduced display area 14, which is the number increase/decrease type.

In this case, as illustrated in FIG. 18C, a key 15 is displayed in the reduced display area 14, causing the screen that is presently displayed to transit to a lower-level screen. The user makes an instruction for entering or selecting a name of the key. In an example illustrated in FIG. 18C, the name of "Mode-A group" is assigned to the key 15.

Figure 18D:
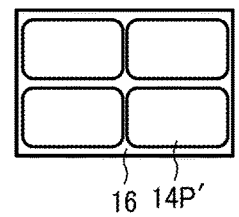

In response to the user selection of the key 15 through the touch panel or the pointing device, the UI parts 14P', each being reduced in size, are displayed on a screen 16, which is the lower-level screen and has the same or substantially the same size as that of the reduced base area 10, as illustrated in FIG. 18D. In an example illustrated in FIG. 18D, the number of the UI parts 14P' displayed on the screen 16 is same as that of the UI parts 14P displayed in the display area 14. Alternatively, the minimum number of the UI parts 14P', required to be collectively displayed, are displayed on the screen 16 while the size of each UI part 14P' remains unchanged from that of the UI part 14. The user is able to make an instruction through the UI part 14P' in substantially the same manner as the UI part 14P.

With this configuration and operation of transiting to the lower-level screen and displaying the UI part on the lower level screen, the size of each UI part displayed on the lower-level screen is kept as a reference size, even in a case where the screen size is small or the resolution is low. Accordingly, the usability of the UI part remains unchanged.

Hereinafter, a description is given of another example process performed by the UI display control unit 223 when the display area is reduced in size in accordance with the reduction of the screen size, with reference to FIGS. 19A to 19C.

Figure 19A:
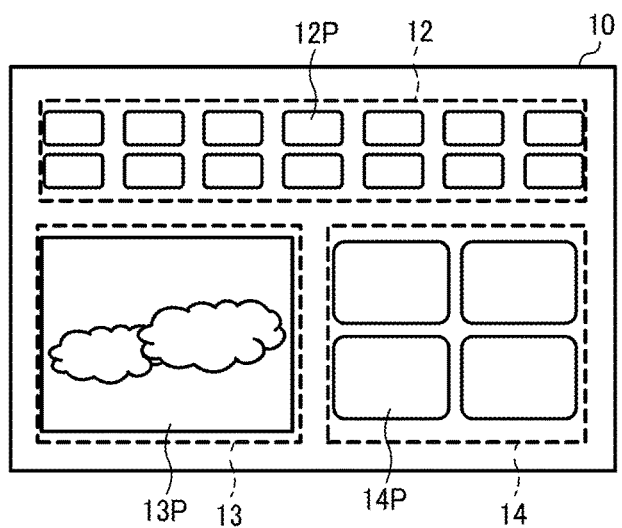
FIGS. 19A to 19C are an illustration for explaining another example of operation performed when the display area is reduced in size in accordance with the reduction of the screen size according to an embodiment of the present invention.
Figure 19B:
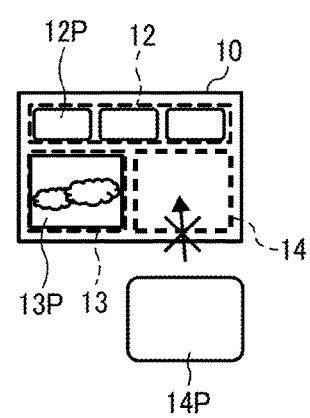
Figure 19C:
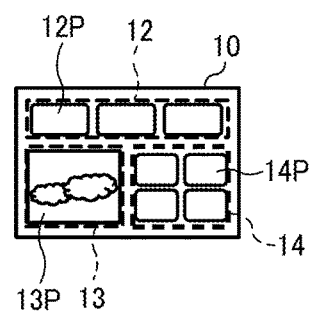

FIGS. 19A and 19B respectively correspond to FIGS. 18A and 18B. As illustrated in FIG. 19B, even a single UI part 14P cannot be arranged in the reduced display area 14, which is the number increase/decrease type.

In this example, four UI parts 14P, each being reduced in size, are displayed in the reduced display area 14, as illustrated in FIG. 18C. Accordingly, the number of the UI parts 14P displayed in the reduced display area 14 is the same as that of the UI parts 14P displayed in the display area 14 on the screen having the default size.

With this configuration and operation of displaying the UI parts, each being reduced in size, in the reduced display area, the user is able to make an instruction with the same number of operation steps, although the displayed UI parts are smaller than the UI parts displayed on the screen of a default size.

Hereinafter, a description is given of an operation performed by the UI display control unit 223 of allowing a user to select either one of the two example operations, with reference to FIGS. 20A to 20E.

In a case where, as illustrated in FIG. 19B, even a single UI part 14P cannot be arranged in the reduced display area 14 of the number increase/decrease type, the UI display control unit 223 displays a selection menu including a message in the base area 10 on the display screen, as illustrated in FIG. 20A. In this example illustrated in FIG. 20A, the selection menu includes a first selection key 17 and a second selection key 18.

The first selection key 17 allows the user to select displaying the UI parts, each being reduced in size, in the display area of which size is reduced. The second selection key 18 allows the user to select causing the presently displayed screen to transit to the lower-level screen and displaying the UI parts on the lower-level screen. The user selects either the first selection key 17 or the second selection key 18 on the selection screen.

In response to the user selection of the first selection key 17 through the touch panel or the pointing device, four UI parts 14P, each being reduced in size, are displayed in the reduced display area 14, as illustrated in FIG. 20B, in substantially the same manner as FIG. 18C.

In response to the user selection of the second selection key 18 through the touch panel or the pointing device, a menu for allowing the user to enter a mode name, as illustrated in FIG. 20C.

This menu allows the user to enter the name of the key 15 illustrated in FIG. 20D for causing the presently displayed screen to transit to the lower-level screen. In the example illustrated in FIG. 20C, the menu includes a box 19 in which the user enters characters or symbols in an area above a bar to the right of "MODE GROUP".

When the user enters "A" in the box 19, the key 15 is displayed labeled with the name "Mode-A Group" in the reduced display area 14 as illustrated in FIG. 20D.

In response to the user selection of the key 15 through the touch panel or the pointing device, the UI parts 14P' is displayed on the screen 16, which is the lower-level screen, as illustrated in FIG. 20E. In an example illustrated in FIG. 20E, the number of the UI parts 14P' displayed on the screen 16 is same as that of the UI parts 14P displayed in the previous display area 14. Alternatively, the minimum number of the UI parts 14P', required to be collectively displayed are displayed on the screen 16. The user is able to give the same instruction through the UI part 14P' as the UI part 14P.

It depends on the user which layout enhances the usability, one causing the size reduction of the UI part as illustrated in FIG. 20B and the other causing the increase of the operation steps as illustrated in FIGS. 20C and 20D. With the configuration and operation as described above, the user is able to select the user's desired layout.

Further, the display input devices sometimes support multiple languages to display information in a specific language corresponding to a country or a region where the display input device is used. The UI parts are usually arranged in view of usability for the users who use languages which are written horizontally from left to right, such as European languages like English, modern Japanese, and modern Chinese.

However, some languages are written horizontally from right to left, such as Arabic, Persian, Hebrew, and Urdu. Although a description is given of the case of Arabic hereinafter, the same or the substantially the same description applies to Persian, Hebrew, and Urdu.

Some typical display input devices associate each UI part with information indicating whether to flip the layout horizontally when the language is switched to Arabic, and flips the layout based on this information, to enhance the usability for Arabic-speaking users.

However, in a case where the screen displays one or more UI parts closely relating to the hardware part, when the layout is just flipped horizontally when the language is switched to Arabic, an appropriate layout that maintains the relation between the UI parts and the hardware parts may not be implemented.

Figure 21A:
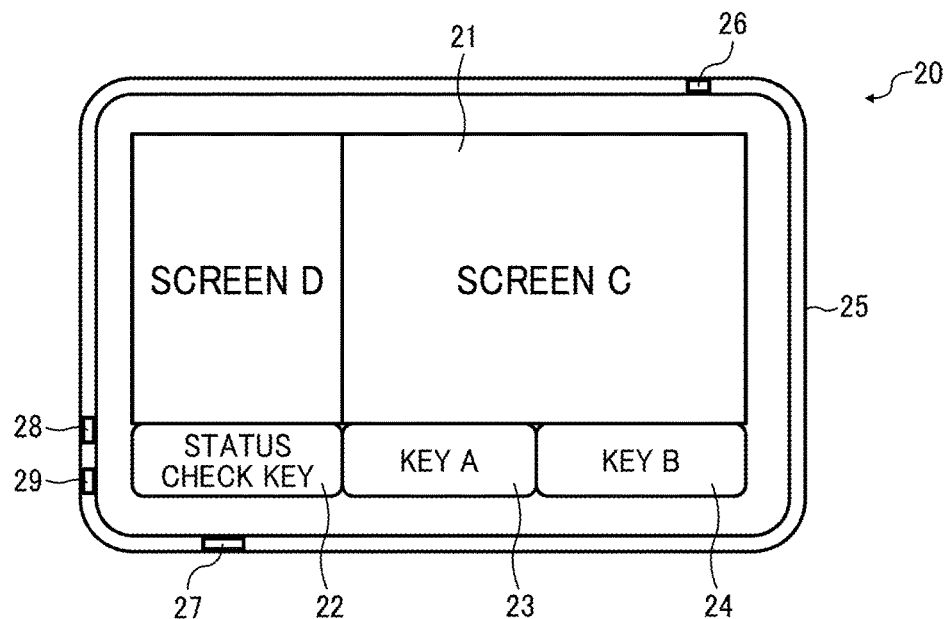
FIGS. 21A and 21B are an illustration for explaining how the layout on the display screen is flipped horizontally according to another embodiment of the present invention.
Figure 21B:
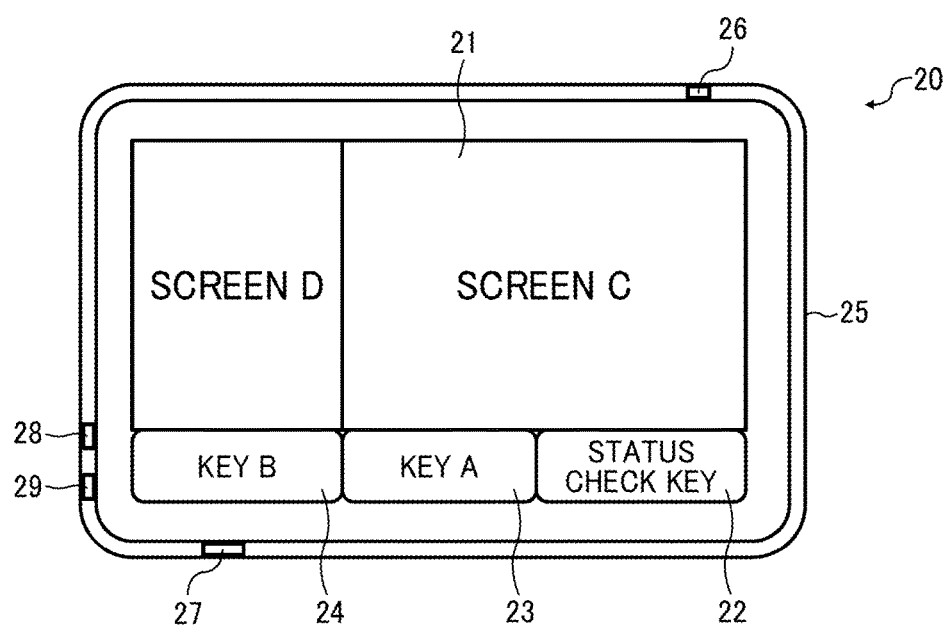

Hereinafter, a description is given of another embodiment of the present invention, where the layout is changed in accordance with the language the user uses. FIGS. 21A and 21B each illustrates a display input device 20 constituting a tablet operation unit. The display input device 20 includes a LCD having a touch panel. On a display screen 21 of the display input device 20, a virtual status-check key 22, a virtual key A 23, a virtual key B 24, each being the UI part, are displayed. Further, a screen C and a screen D are displayed on the display screen 21. The display input device 20 includes a frame 25 surrounding the display screen 21. The frame 25 includes a power light emitting diode (LED) 26, a status check LED 27, a fax LED, a data-in LED 29, each being a hardware part. The display input device may further include a hardware key to be depressed for operation.

As illustrated in FIG. 21A, the virtual status-check key 22 as the UI part is required to be placed near the status check LED 27, which is the hardware part corresponding to the virtual status-check key 22.

When the virtual status-check key 22 and the virtual key B 24 are reversed in response to switching of the user's language to Arabic, the display input device 20 displays the layout as illustrated in FIG. 21B. As illustrated in FIG. 21B, the virtual status-check key 22 is placed far from the status check LED 27. In other words, in an example of FIG. 21B, the UI parts are not arranged properly to correspond to the hardware parts.

For this reason, the display input device 20 according to this embodiment implements a function of flipping the layout of the UI parts according to the user's language. In addition, the display input device 20 implements a function of determining whether to flip the layout based on the relation between the UI parts and the hardware UI parts and arranging the UI parts based on the determination result.

In this embodiment, information is stored associating each UI part with the ID of the corresponding hardware part. When the language is switched into Arabic, a suitable layout is selected from the flipped layout including the UI parts and the non-flipped layout. Specifically, a layout is selected in which a coordinate of the UI part is closer to a coordinate of the hardware part.

Thus, even when the layout of the UI parts is horizontally flipped in an Arabic mode, the layout of some of the UI parts remain unchanged based on the relation between the UI parts and the hardware parts.

Hereinafter, a description is given of this embodiment with reference to FIGS. 22 to 31.

The display input device 20 is used as an operation unit of an image forming apparatus, for example. The operation unit and a main unit of the image forming apparatus have the same or substantially the same hardware and functional configurations as those of the operation unit 200 and the main unit 100 illustrated in FIGS. 2 and 3, and the description thereof is omitted.

Figures 22, 23:
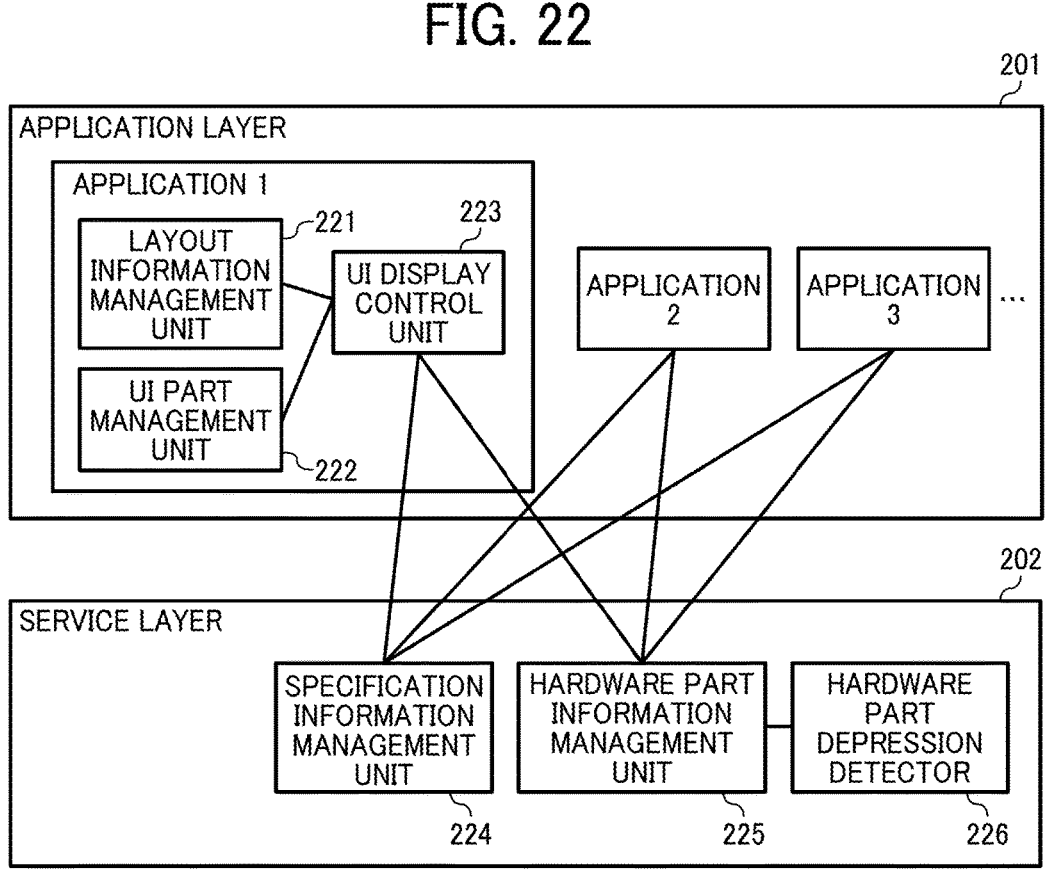
FIG. 22 is a block diagram illustrating a functional configuration of the display input device according to another embodiment of the present invention.
FIG. 23 is an example table of hardware part information stored in a hardware part management unit according to another embodiment of the present invention.

FIG. 22 is a block diagram illustrating a functional configuration of the display input device 20 according to this embodiment. In FIG. 22, the same reference numbers are allocated to elements having the same or substantially the same function as those of FIG. 4.

The service layer 202 of the display input device 20 as the operation unit includes a hardware part information management unit 225 and a hardware part depression detector 226 in addition to the specification information management unit 224. Further, as described above with reference to FIG. 21A, the display input device 20 includes the hardware parts such as the status check LED 27 in the frame 25 surrounding the display screen 21.

As illustrated in FIG. 22, the hardware part information management unit 225 is connected to the UI part display control unit 223 of each application included in the application layer 201. As illustrated in FIG. 23, the hardware part information management unit 225 manages information indicating whether information on the hardware parts such as the power LED 26, the status check LED 27, and a home key is already entered, and information associating each hardware part with a position coordinate.

The position coordinate of the hardware part is obtained using the number of pixels (a value converted to the number of pixels within the frame 25) with an upper-left corner of the touch panel as the origin.

For example, in a case where the screen resolution is 1024*600, the y-coordinate of the hardware part above the upper edge of the touch panel is negative such as (1000, −10). By contrast, the y-coordinate of the hardware part below the bottom edge of the touch panel exceeds the screen resolution (the number of pixels) in the height, such as (512, 650).

In a case where the hardware part information is not yet entered, the hardware part information management unit 225 causes the UI part display control unit 223 to display menus as illustrated in FIGS. 24A to 24D to allow the user to enter information on one or more hardware parts that the display input device 20 includes and the position coordinate of the hardware part. Thus, the hardware part information is entered.

When the display input device 20 is turned on, the UI display control unit 223 displays a menu illustrated in FIG. 24A. The menu includes a table listing the hardware parts, and check boxes that allow the user to select the hardware part that the display input device 20 includes. Further, as illustrated in FIG. 24B, the UI display control unit 223 highlights a row corresponding to the hardware selected by the user. Thereafter, in response to a cell of the position coordinate corresponding to the selected hardware part being touched as illustrated in FIG. 24B, the UI display control unit 223 displays a virtual numeric keypad for allowing the user to enter the x-coordinate and the y-coordinate, two boxes respectively displaying the entered x- and y-coordinates, and a virtual enter key, as illustrated in FIG. 24C.

Furthermore, in response to the virtual enter key being touched after the input of the x- and y-coordinates, the UI display control unit 223 displays the coordinate information of the selected hardware part in the table for confirmation, as illustrated in FIG. 24D. Still further, in a case where the user selects another hardware part in the menu as illustrated In FIG. 24A, the UI display control unit 223 displays substantially the same menus as illustrated in FIG. 24B to highlight the row corresponding to the newly selected hardware part. Thereafter, the UI display control unit 223 displays substantially the same menu as illustrated in FIG. 24C to allow the user to enter the x- and y-coordinates of the newly selected hardware part, and displays the substantially the same menu as illustrated in FIG. 24D to display the entered coordinate information in the table.

Thus, the information indicating one or more hardware parts that the display input device 20 includes and the position coordinate of the hardware part is entered. Accordingly, in a case where the same software in installed on another hardware, the layout of the UI parts suitable for the hardware is implemented.

In a case where the display input device 20 includes a hardware part that is depressed for operation, the UI display control unit 223 displays menus as illustrated in FIGS. 25A to 25D to allow the user add information a new hardware part and enter the hardware part information on the new hardware part.

Specifically, in response to the hardware part being depressed by the user, the hardware part information management unit 225 causes the UI part display control unit 223 to display the menu that allows the user to enter information on one or more hardware parts that the display input device 20 includes and the position coordinate of the hardware part.

More specifically, the hardware part depression detector 226 detects the depression of the hardware part to send the detection signal to the hardware part information management unit 225. In response to receiving the detection signal, the hardware part information management unit 225 causes the UI part display control unit 223 to display a menu as illustrated in FIG. 25A to allow the user to enter a name of the depressed hardware part. The UI display control unit 223 also displays a software keyboard with which the user enters the name. In an example illustrated in FIG. 25A, the user enters the name "NEW HARDWARE KEY".

Accordingly, the UI part display control unit 223 adds a new hardware part having the name of "NEW HARDWARE KEY" to the table as illustrated in FIG. 25B. The UI part display control unit 223 also puts a mark in the check box corresponding to the newly added hardware part, and highlights a row corresponding to the newly added hardware part.

Thereafter, in response to a cell of the position coordinate corresponding to the "NEW HARDWARE KEY" being touched as illustrated in FIG. 25B, the UI display control unit 223 displays a menu that allows the user to enter the x- and y-coordinates as illustrated in FIG. 25C. The menu illustrated in FIG. 25B is substantially the same as that of FIG. 24C. Thereafter, in response to the virtual enter key being touched after the input of the x- and y-coordinates, the UI display control unit 223 displays the coordinate information of the "NEW HARDWARE KEY" in the table for confirmation, as illustrated in FIG. 25D.

In an example illustrated in FIG. 25D, the position coordinate of the home key has been already entered before the depression of the hardware part.

Thus, the information indicating one or more hardware parts that the display input device 20 includes and the position coordinate of the hardware part is entered. Accordingly, in a case where the software in installed on another hardware having a new hard part, the layout of the UI parts suitable for the hardware is implemented.

The hardware part depression detector 226 illustrated in FIG. 22 detects the depression of the hardware part to send the detection signal to the hardware part information management unit 225. The UI part display control unit 223 acquires the detection signal from the hardware part information management unit 225 to display the screen as illustrated in FIG. 25A to enter the coordinate information of the new hardware part.

The UI part management unit 222 manages the UI part information in substantially the same manner as the above-described embodiment. In addition, the UI part information stored the UI part management unit 222 includes the information of the hardware part corresponding to the UI part. An example of the UI part information according to this embodiment will be described later in detail.

The layout information management unit 221 manages the layout information indicating how the UI parts are to be arranged in substantially the same manner as the above-described embodiment. An example of the layout information according to this embodiment will be described later in detail.

The UI part display control unit 223 displays the UI parts on the display screen based on the layout information stored in the layout information management unit 221 and the UI part information stored in the UI part management unit 222 in substantially the same manner as the above-described embodiment.

In addition, the UI part display control unit 223 according to this embodiment horizontally flips the layout of a group of the UI parts that are arranged in a horizontal direction of the screen among the plurality of the groups described above. Further, in a case where one or more UI parts in the group correspond to any hardware part that the display input device 20 includes, the UI part display control unit 223 determines whether to flip the layout the UI parts to display the UI parts based on the determination result. Specifically, when the coordinate of the UI part corresponding to the hardware part in the flipped layout is closer to the hardware part than the coordinate of the UI part in the original layout, the UI display control unit 223 does not horizontally flip the positions of the UI parts in the group.

Further, the UI part display control unit 223 flips the layout of the UI parts based on the relation between the UI parts and the hardware parts in a case where the user's language is an language that is written horizontally from right to left, such as Arabic.

In other words, the UI part display control unit 223 may flip the layout of the group of the UI parts that are arranged in a horizontal direction of the screen when the language of the display input device 20 is or is switched to the language that is written horizontally from right to left, such as Arabic.

FIG. 26 is a flowchart illustrating an operation of flipping the layout of the UI parts. This operation may be executed in addition to the operation described above with reference to at least the flowchart of FIG. 10.

The CPU 211 of the operation unit 200 controls the display panel of the control panel 217 according to a program stored in the ROM 212 to implement the operation of FIG. 26.

First, at S21, the CPU 211, determines whether the hardware part information is already stored. The hardware part information management unit 225 has a function of executing the processing at S21.

When the CPU 211 determines that the hardware part information is not already stored (S21: NO), the processing proceeds to S22. At S22, the CPU 211 displays the menu that allows the user to enter information on one or more hardware part that the display input device 20 includes and the position coordinate of the hardware part as described above with reference to FIGS. 24A to 24D.

The CPU 211 may further perform the processing as described above with reference to FIGS. 25A to 25D of adding information on a new hardware part in response to the new hardware part being depressed by the user and displaying the menu that allows the user to enter the position coordinate of the new hardware part.

The hardware part information management unit 225 and the UI part display control unit 223 illustrated in FIG. 22 have a function of executing the processing at S22.

When the CPU 211 determines that the hardware part information is already stored (S21: YES) or after S22, the CPU 211 performs the processing from S24 to S28 on each of the groups in the layout (S23). The UI part display control unit 223 illustrated in FIG. 22 has a function of executing the processing from S24 to S28.

This "group" corresponds to the display area of the embodiment described above with reference to FIGS. 1 to 20. The UI parts belonging to the same group have the same attribute, and have the same or substantially the same shape and size. Further, the operation of FIG. 26 is performed on the group in which the UI parts are arranged in the horizontal direction of screen.

At S24, the CPU 211 determines whether one or more UI parts in the group correspond to the hardware parts that the display input device 20 includes.

For example, in a case where the virtual status-check key 22, the virtual key A, and the virtual key B illustrated in FIG. 21A or 21B constitute a single group, the group includes the virtual status-check key 22 that corresponds to the status check LED 27, which is the hardware part. In this example case, the CPU 211 determines that the group includes the UI part corresponding to the hardware part (S24: YES), and the processing proceeds to S25. When the CPU 211 determines that the group includes no UI part corresponding to the hardware pat (S24: NO), the processing proceeds to S28.

At S25, the CPU 211 acquires the coordinate information of the hardware part corresponding to the UI part. At S26, the CPU 211 calculates the coordinate of the UI part corresponding to the hardware part in the layout in which the positions of the UI parts in the group are horizontally flipped.

Next, at S27, the CPU 211 determines whether the distance between the hardware part and the UI part in the original layout is shorter than the distance between the hardware part and the UI part in the flipped layout.

When the CPU 211 determines that the distance between the hardware part and the UI part in the original layout is longer than the distance between the hardware part and the UI part in the flipped layout (S27: YES), the processing proceeds to S28. At S28, the CPU 211 horizontally flips the positions of the UI parts in the group. By contrast, when the CPU 211 determines that distance between the hardware part and the UI part in the original layout is shorter than the distance between the hardware part and the UI part in the flipped layout (S27: NO), the processing returns to S23, to repeat the processing from S24 to S28 on another group of the UI parts.

When the CPU 211 performs processing from S24 to S28 to all of the groups of the UI parts, the processing ends.

Hereinafter, a detailed description is given of S24 to S28, with reference to FIGS. 27 to 31.

FIG. 27 illustrates an example of the layout of the display screen. FIG. 28 is an example of the layout information corresponding to the layout illustrated in FIG. 27. FIG. 29 is a view illustrating the display screen on which the layout information illustrated in FIG. 28 is visually represented.

FIG. 30 is an example of the UI part information on the UI parts displayed on the display screen illustrated in FIG. 27. Although FIG. 30 illustrates a figure or image of each UI part, the UI part information in fact includes a file path name corresponding to each UI part. FIG. 31 is an example of the hardware part information.

In FIG. 27, the same reference numbers are allocated to the virtual status-check key 22, virtual key J 23, and virtual key 24 having the same or substantially the same function as those of FIG. 21. Further, as illustrated in FIGS. 28 and 29, the virtual keys A to C and E to G constitute a group 01, and virtual keys H and I constitute a group 02. In addition, the virtual status-check key 22, the virtual key J 23, and the virtual key K 24 constitute a group 03. The virtual status-check key 22 of FIG. 27 corresponds to the status check LED 27, in substantially the same manner as the virtual status-check key 22 of FIG. 21.

The layout information management unit 221, the UI part management unit 222, and the hardware part information management unit 225 illustrated in FIG. 22 respectively store the layout information of FIG. 28, the UI part information of FIG. 30, and the hardware part information of FIG. 31.

At S24 in FIG. 26, the UI part display control unit 223 illustrated in FIG. 22, which is implemented by the CPU 211, determines whether one or more UI parts in the group correspond to the hardware parts that the display input device 20 includes. More specifically, the UI part display control unit 223 performs the determination at S24 based on the layout information stored in the layout information management unit 221, the UI part information stored in the UI part management unit 222, and the hardware part information stored in the hardware part information management unit 225.

For example, when the UI parts are arranged on the display screen as illustrated in FIG. 27, the UI parts associated with the IDs of 01 to 06 belong to the group 01 as illustrated in FIGS. 28 and 29. In this case, according to the UI part information illustrated in FIG. 30, none of the UI parts associated with the IDs 01 to 06 does not correspond to any hardware part that the display input device 20 includes.

Accordingly, the UI display control unit 223 outputs the determination result indicating "NO" at S24, and the processing proceeds to S28. At S28, the UI display control unit 223 horizontally flips the positions of the UI parts associated with the IDs 01 to 06 in the group 01.

Further, the UI parts associated with the IDs of 07 and 08 belong to the group 02 as illustrated in FIGS. 28 and 29. As illustrated in FIG. 30, neither the UI part associated with the ID 07 nor the UI part associated with the ID 08 does not correspond to any hardware part that the display input device 20 includes. Accordingly, the UI display control unit also outputs the determination result indicating "NO" at S24 with respect to the group 02, and the processing proceeds to S28. At S28, the UI display control unit 223 horizontally flips the positions of the UI parts respectively associated with the IDs 07 and 08 in the group 02.

Specifically, the UI display control unit 223 calculates the x-coordinate of each UI part by the following Equation (1) to horizontally flip the positions of the UI parts in each group.

$$x\text{-coordinate} = (x\text{-coordinate of the right edge of the group}) - (x\text{-coordinate of the } UI \text{ part}) - (\text{size of the } UI \text{ part in } x\text{-direction}) \quad \text{Equation (1):}$$

Furthermore, the UI parts associated with the IDs of 09 to 11 belong to the group 03 as illustrated in FIGS. 28 and 29. As illustrated in FIG. 30, the UI part associated with the ID 09 corresponds to the status check LED 27 associated with the ID 03 (see the hardware part information illustrated in FIG. 31).

Accordingly, the UI display control unit 223 outputs the determination result indicating "YES" at S24, and the processing proceeds to S25. At S28, the UI display control unit 223 horizontally acquires the position coordinate information of the hardware part corresponding to the UI part associated with the ID 09. More specifically, the UI part display control unit 223 acquires the coordinate data (10, 620) of the status check LED 27 (ID: 03) from the hardware part information illustrated in FIG. 31 stored in the hardware part information management unit 225.

Subsequently, at S26 in FIG. 26, the UI display control unit 223 calculates the coordinate of the virtual status-check key 22 corresponding to the status check LED 27 in the layout in which the positions the UI parts associated with the IDs 09 to 11 in the group 03 are horizontally flipped.

More specifically, at S26, the UI display control unit 223 calculates the coordinate of the virtual status-check key 22 corresponding to the hardware part in the layout in which the virtual status-check key 22 is horizontally flipped in the group 03 by the following Equation (2).

$$x\text{-coordinate} = (x\text{-coordinate of the right edge of the group 03}) - (x\text{-coordinate of the virtual status-check key 22}) - (\text{size of the virtual status-check key 22 in } x\text{-direction}) \; y\text{-coordinate} = \text{original value} \quad \text{Equation (2):}$$

According to the UI part information illustrated in FIG. 28, the x-coordinate value of the right edge of the group 03 is "1024", the x-coordinate of the virtual status-check key 22 (ID: 09) is "5", the y-coordinate of the virtual status-check key 22 (ID: 09) is "565", and the size of the virtual status-check key 22 in x-direction is "200". Accordingly, the x- and y-coordinate of the virtual status-check key 22 in the flipped layout are as follows:

$$x\text{-coordinate} = 1024 - 5 - 200 = 819$$

$$y\text{-coordinate} = 565$$

Thus, the coordinate of the virtual status-check key 22 in the flipped layout is (819, 565), while the coordinate of the virtual status-check key 22 in the original layout is (5, 565).

Next, at S27 in FIG. 26, the UI display control unit 223 which one of the coordinate of the virtual status-check key 22 in the flipped layout and the coordinate of the virtual status-check key 22 in the original layout is closer to the coordinate of the status check LED 27.

In this case, the coordinate (5, 565) of the virtual status-check key 22 in the original layout is closer to the coordinate (10, 620) of the status check LED 27 than the coordinate (819, 565) of the virtual status-check key 22 in the flipped layout. Accordingly, the UI display control unit 223 outputs the determination result indicating "NO" at S27, and the processing returns to S23 or ends without horizontally flipping the positions of the UI parts in the group 03.

The present invention is not limited to the details of the example embodiments described above, and various modifications and improvements are possible. For example, the digital MFP is one example of the image forming apparatus 5. Examples of the image forming apparatus 5 also include a digital copying machine or a facsimile machine having a scanner, a discrete printer, and a simple printer. The image forming apparatus 5 may be either a multi-color image forming apparatus or a monochrome image forming apparatus.

Further, the operation unit 200 of the image forming apparatus 5 is one example of the display input device according to the present invention. Examples of the display input device includes an operation unit (user interface unit) of various electronic apparatuses such as various information processing apparatuses, office electronic devices, home electronic devices, and industrial electronic devices. Furthermore, common UI parts are arranged in substantially the similar layout on a display panel having various screen sizes or screen resolutions included in the apparatuses or devices according to a common program.

A method according to an embodiment of the present invention is directed to a method for controlling display by the display input device including the display panel having the screen on which the plurality of the UI parts are displayed. The method includes dividing the plurality of the UI parts into a plurality of groups such that the UI parts having the same attribute and to be arranged adjacent to each other belong to the same group. The method further includes assigning a plurality of display areas respectively to the plurality of groups of the UI parts. The method further includes scaling each display area in accordance with a change in the screen size or the screen resolution of the display panel. The method further includes scaling the UI part in the scaled display area, or increasing or decreasing the number of the UI parts in the scaled display area.

Furthermore, a program according to an embodiment of the present invention is directed to a program for causing a computer for controlling an operation of a display input device including a display panel having a screen on which a plurality of graphical user interfaces (GUI) configured to interact with a user are displayed, to perform a method. The method includes dividing the plurality of the UI parts into a plurality of groups such that the UI parts having the same attribute and to be arranged adjacent to each other belong to the same group. The method further includes assigning a plurality of display areas respectively to the plurality of groups of the UI parts. The method further includes scaling each display area in accordance with a change in the screen size or the screen resolution of the display panel. The method further includes scaling the UI part in the scaled display area, or increasing or decreasing the number of the UI parts in the scaled display area.

The program may be stored in advance in the ROM or the HDD of the microcomputer for controlling an operation of the operation unit of the image forming apparatus or the electronic device. The program may be provided using any storage medium that is readable by a computer, such as a compact disc (CD) ROM, magneto-optical disc (MO), digital versatile disc (DVD), a flexible disc, erasable programmable read-only memory (EPROM), or electrically erasable PROM. Alternatively, the program may be transmitted via network such as the Internet such that the image forming apparatus or the electronic device can download the program to its memory.

According to the embodiment of the present invention, the UI parts are displayed in the user-friendly layout in a case where the user's language is the language written horizontally from right to left, such as Arabic.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A display input device, comprising:
a display panel configured to display a screen thereon, the screen including at least a first display area associated with image-type graphical user interface (GUI) elements and a second display area associated with key-type GUI elements, the first display area including at least one image-type GUI element and the second display area including a plurality of key-type GUI elements, each of the key-type GUI elements associated with a physical hardware component of an image forming device, the first display area only permits changing a size of the image-type GUI elements displayed within the first display area in response to a change to the first display area, the second display area only permits changing a number of key-type GUI elements displayed within the second display area in response to a change to the second display area, the display input device connected to the image forming device;
a memory having stored thereon computer readable instructions, and
stores screen information indicating screen size information and screen resolution information related to the display panel,
stores first display area information indicating a change in size of the image-type GUI element based on a new size or new resolution of the first display area,
stores second display area information indicating a change in number of key-type GUI elements displayed in the second display area based on a new size or new resolution of the second display area; and
at least one processor configured to execute the computer readable instructions to,
detect that the display panel has been changed,
acquire screen size information of the changed display panel,
change the size or the resolution of the first display area and the size or the resolution of the second display area in accordance with the acquired screen size information of the changed display panel,
automatically change the size of the image-type GUI element included in the first display area in response to the change in the size or the resolution of the first display area based on the first display area information,
automatically change the number of displayed key-type GUI elements included in the second display area based on the second display area information,
display the changed first display area including the changed image-type GUI element on the display panel, and
display the changed second display area including the changed number of displayed key-type GUI elements on the display panel, wherein
in response to the first display area being changed to be smaller than a desired size, the image-type GUI elements included in the first display area are grouped under a first single group GUI element and the first single group GUI element is displayed in the first display area instead of the image-type GUI elements, and
in response to the second display area being changed to be smaller than the desired size, the key-type GUI elements included in the second display area are grouped under a second single group GUI element and the second single group GUI element is displayed in the second display area instead of the key-type GUI elements.

2. The display input device according to claim 1, wherein the at least one processor is further configured to:
classify the plurality of key-type GUI elements to be displayed on the screen into a plurality of groups of key-type GUI elements; and
assign the plurality of groups of key-type GUI elements to a plurality of second display areas associated with the key type GUI elements, based on attribute information included in UI part information and attribute information included in the second display area information, the UI part information including UI identifier information, the attribute information, and UI size information.

3. The display input device according to claim 2, wherein:
the attribute information included in the UI part information indicates, for each one of the plurality of GUI elements to be displayed on the screen, whether the GUI element belongs to a image-type or a key-type.

4. The display input device according to claim 3, wherein:
the first display area is a plurality of first display areas; and
when the number of the GUI elements in each of the first display areas decreases due to a reduction of the size or the resolution of the display panel, and none of the GUI elements in each of the first display areas are key-type GUI elements, the at least one processor is further configured to,
display, in the first display area, an icon that causes the screen presently displayed to transition to a lower-level screen, the lower level screen including the group of GUI elements in the first display area.

5. The display input device according to claim 3, wherein:
the first display area is a plurality of first display areas; and
when the number of the GUI elements in each first display areas decreases due to a reduction of the size or the resolution of the display panel, and none of the GUI elements in each of the first display areas are key-type GUI elements, the at least one processor is further configured to,
reduce the size of each of the GUI elements, and
display the GUI elements in the respective first display areas.

6. The display input device according to claim 3, wherein:
the first display area is a plurality of first display areas; and
when the number of the GUI elements in each of the first display areas decreases due to a reduction of the size or the resolution of the display panel, and none of the GUI elements in each of the first display areas, the at least one processor is further configured to,
display a menu that allows selection of a first option or a second option,
the first option being to display the GUI elements, each having a reduced size, in the respective first display areas, and
the second option being to display, in the first display areas, an icon that causes the screen presently displayed to transition to a lower-level screen, the lower level screen including the GUI elements in the respective first display areas.

7. The display input device according to claim 2, further comprising:
at least one hardware part on a periphery of the screen of the display panel, the at least one hardware part being at least one physical hardware component of the image forming device, and wherein,
the memory further stores hardware part information that indicates position coordinates of the hardware part,
the UI part information further includes information on the hardware part in association with each one of the plurality of GUI elements to be displayed on the screen, and
when at least one GUI element of the plurality of GUI elements corresponds to the hardware part, the at least one processor is further configured to,
determine whether a distance between the coordinates of the GUI element and the coordinates of the hardware part in a flipped layout, the flipped layout being shorter than a distance between the coordinates of the GUI element and the coordinates of the hardware part in the original layout, and
horizontally flip a layout of the group of the GUI elements that are arranged in a horizontal direction of the screen, based on a determination that the distance between the coordinates of the GUI element and the coordinates of the hardware part in the flipped layout is shorter.

8. The display input device according to claim 7, wherein the at least one processor is further configured to:
horizontally flip the layout of the group of the GUI elements that are arranged in the horizontal direction of the screen, in response to a switching of a user language to a language that is written horizontally from right to left.

9. The display input device according to claim 7, wherein the at least one processor is further configured to display a menu that allows input of information to indicate which hardware part is included in the display input device and the position coordinates of the hardware part.

10. The display input device according to claim 9, wherein:
when the hardware part is a hardware part that is depressed for operation, the at least one processor is further configured to display the menu that allows input of the information indicating which hardware part is included in the display input device and the position coordinates of the hardware part in response to a detection signal indicating that the hardware part is depressed.

11. An image forming apparatus, comprising:
an image forming device; and
the display input device according to claim 1, the display input device configured to operate as an operation unit for the image forming device.

12. A method for controlling display of a screen on a display panel, the screen including at least a first display area associated with image-type graphical user interface (GUI) elements and a second display area associated with key-type GUI elements, the first display area including at least one image-type GUI element and the second display area including a plurality of key-type GUI elements, each of the key-type GUI elements associated with a physical hardware component of an image forming device, the first display area only permits changing a size of the image-type GUI elements displayed within the first display area in response to a change to the first display area, the second display area only permits changing a number of key-type GUI elements displayed within the second display area in response to a change to the second display area, the display panel connected to the image forming device, the method comprising:
detecting, using at least one processor, that the display panel has been changed;
acquiring, using the at least one processor, screen size information of the changed display panel;
storing, using the at least one processor, screen information including the screen size information and screen resolution information related to the changed display panel in a memory;
storing, using the at least one processor, first display area information indicating a change in size of the image-type GUI element based on a new size or new resolution of the first display area included in the acquired screen size information of the changed display panel in the memory;
storing, using the at least one processor, second display area information indicating a change in number of key-type GUI elements displayed in the second display area based on a new size or new resolution of the second display area included in the acquired screen size information of the changed display panel in the memory;

changing, using the at least one processor, the size or the resolution of the first display area and the size or the resolution of the second display area in accordance with the acquired screen size information of the changed display panel;

automatically changing, using the at least one processor, the size of the image-type GUI element included in the first display area in response to the change in the size or the resolution of the first display area based on the first display area information;

automatically changing, using the at least one processor, the number of displayed key-type GUI elements included in the second display area based on the second display area information;

displaying, using the at least one processor, the changed first display area including the changed image-type GUI element on the display panel; and displaying, using the at least one processor, the changed second display area including the changed number of displayed key-type GUI elements on the display panel, wherein in response to the first display area being changed to be smaller than a desired size, the image-type GUI elements included in the first display area are grouped under a first single group GUI element and the first single group GUI element is displayed in the first display area instead of the image-type GUI elements, and in response to the second display area being changed to be smaller than the desired size, the key-type GUI elements included in the second display area are grouped under a second single group GUI element and the second single group GUI element is displayed in the second display area instead of the key-type GUI elements.

13. A non-transitory computer-readable medium storing computer readable instructions, which when executed by at least one processor, causes the at least one processor to perform a method of controlling display of a screen on a display panel, the screen including at least a first display area associated with image-type graphical user interface (GUI) elements and a second display area associated with key-type GUI elements, the first display area including at least one image-type GUI element and the second display area including a plurality of key-type GUI elements, each of the key-type GUI elements associated with a physical hardware component of an image forming device, the first display area only permits changing a size of the image-type GUI elements displayed within the first display area in response to a change to the first display area, the second display area only permits changing a number of key-type GUI elements displayed within the second display area in response to a change to the second display area, the display panel connected to the image forming device, the method comprising:

detecting that the display panel has been changed;

acquiring screen size information of the changed display panel;

storing screen information including the screen size information and screen resolution information related to the display panel in a memory;

storing first display area information indicating a change in size of the image-type GUI element based on a new size or new resolution of the first display area included in the acquired screen size information of the changed display panel in the memory;

storing second display area information indicating a change in number of key-type GUI elements displayed in the second display area based on a new size or new resolution of the first display area included in the acquired screen size information of the changed display panel in the memory;

changing the size or the resolution of the first display area and the size or the resolution of the second display area in accordance with the acquired screen size information of the changed display panel;

automatically changing the size of the image-type GUI element included in the first display area in response to the change in the size or the resolution of the first display area based on the first display area information;

automatically changing the number of displayed key-type GUI elements included in the second display area based on the second display area information;

displaying the changed first display area including the changed image-type GUI element on the display panel; and displaying the changed second display area including the changed number of displayed key-type GUI elements on the display panel, wherein in response to the first display area being changed to be smaller than a desired size, the image-type GUI elements included in the first display area are grouped under a first single group GUI element and the first single group GUI element is displayed in the first display area instead of the image-type GUI elements, and in response to the second display area being changed to be smaller than the desired size, the key-type GUI elements included in the second display area are grouped under a second single group GUI element and the second single group GUI element is displayed in the second display area instead of the key-type GUI elements.

14. The display input device according to claim 1, wherein the image forming device is a multi-function printer (MFP) and the display input device is detachably connected to the MFP.

15. The display input device according to claim 14, wherein the display input device is configured to operate as an operation unit for the MFP.

16. The display input device according to claim 14, wherein the display input device is a tablet.

17. The image forming apparatus according to claim 11, wherein
the image forming device is a multi-function printer (MFP); and
the display input device is detachably connected to the MFP.

18. The image forming apparatus according to claim 17, wherein the display input device is a tablet.

19. The method according to claim 12, wherein the display panel is included in a display input device that is detachably connected to a multi-function printer (MFP).

20. The method according to claim 19, wherein the display input device is configured to operate as an operation unit for the MFP.

* * * * *